United States Patent
Kameshima et al.

(10) Patent No.: US 10,112,539 B2
(45) Date of Patent: Oct. 30, 2018

(54) IMAGE DISPLAY CONTROL APPARATUS, IMAGE DISPLAY SYSTEM AND DISPLAY UNIT FOR DISPLAYING REAR-VIEW IMAGE BASED ON EYE POINT OF A DRIVER OR ANGLE OF A DISPLAY DEVICE

(71) Applicant: AISIN SEIKI KABUSHIKI KAISHA, Kariya-shi, Aichi (JP)

(72) Inventors: Tamotsu Kameshima, Kariya (JP); Yoshikuni Hashimoto, Anjo (JP); Takayuki Higo, Nagoya (JP); Naoki Kajigai, Anjo (JP)

(73) Assignee: AISIN SEIKI KABUSHIKI KAISHA, Toyota-shi, Aichi (JP)

( * ) Notice: Subject to any disclaimer, the term of this patent is extended or adjusted under 35 U.S.C. 154(b) by 196 days.

(21) Appl. No.: 14/778,166

(22) PCT Filed: Mar. 17, 2014

(86) PCT No.: PCT/JP2014/057202
§ 371 (c)(1),
(2) Date: Sep. 18, 2015

(87) PCT Pub. No.: WO2014/156788
PCT Pub. Date: Oct. 2, 2014

(65) Prior Publication Data
US 2016/0288717 A1    Oct. 6, 2016

(30) Foreign Application Priority Data
Mar. 29, 2013  (JP) ................................. 2013-074917

(51) Int. Cl.
*B60R 1/12* (2006.01)
*G06F 3/14* (2006.01)
(Continued)

(52) U.S. Cl.
CPC ................ *B60R 1/12* (2013.01); *B60K 35/00* (2013.01); *B60R 1/00* (2013.01); *B60R 1/04* (2013.01);
(Continued)

(58) Field of Classification Search
CPC .. B60K 35/00; B60R 1/00; B60R 1/04; B60R 1/12; B60R 2001/1253; B60R 2300/202;
(Continued)

(56) References Cited

U.S. PATENT DOCUMENTS

2003/0122930 A1* 7/2003 Schofield .................. B60R 1/00
  348/148
2008/0007428 A1   1/2008 Watanabe
(Continued)

FOREIGN PATENT DOCUMENTS

CN    201281928 Y    7/2009
JP    2002-274259 A  9/2002
(Continued)

OTHER PUBLICATIONS

Communication dated Apr. 5, 2017 issued by the State Intellectual Property Office of People's Republic of China in counterpart application No. 201480018813.1.
(Continued)

*Primary Examiner* — Francis G Geroleo
(74) *Attorney, Agent, or Firm* — Sughrue Mion, PLLC

(57) ABSTRACT

An image display control apparatus including an image generation portion generating an output image which resembles a map of a room mirror using at least a vehicle outside image based on at least one of a detection result of an eye point position acquisition portion detecting a position of an eye point of a driver and a detection result of an angle acquisition portion detecting an angle of a display device, and a display control portion controlling the display device
(Continued)

so that the display device displays the output image generated by the image generation portion. The output image which is similar to the map of the room mirror may be displayed at the display device.

14 Claims, 18 Drawing Sheets

(51) Int. Cl.
| | | |
|---|---|---|
| *G06F 3/01* | (2006.01) | |
| *H04N 5/232* | (2006.01) | |
| *B60K 35/00* | (2006.01) | |
| *B60R 1/04* | (2006.01) | |
| *B60R 1/00* | (2006.01) | |
| *G06T 7/73* | (2017.01) | |
| *H04N 7/18* | (2006.01) | |

(52) U.S. Cl.
CPC ............... *G06F 3/013* (2013.01); *G06F 3/14* (2013.01); *G06T 7/73* (2017.01); *H04N 5/23293* (2013.01); *B60R 2001/1253* (2013.01); *B60R 2300/202* (2013.01); *B60R 2300/303* (2013.01); *G06T 2207/30196* (2013.01); *G06T 2207/30268* (2013.01); *G09G 2380/10* (2013.01); *H04N 7/18* (2013.01)

(58) Field of Classification Search
CPC ..... B60R 2300/303; G06F 3/013; G06F 3/14; G06T 2207/30196; G06T 2207/30268; G06T 7/73; G09G 5/00; G09G 5/02
USPC ........................................................ 348/148
See application file for complete search history.

(56) References Cited

U.S. PATENT DOCUMENTS

| | | |
|---|---|---|
| 2008/0231703 A1 | 9/2008 | Nagata et al. |
| 2010/0128128 A1* | 5/2010 | Nagamine ............. B60W 50/14 348/148 |
| 2014/0347488 A1* | 11/2014 | Tazaki ...................... B60R 1/04 348/148 |

FOREIGN PATENT DOCUMENTS

| | | | | |
|---|---|---|---|---|
| JP | 2005-123968 A | | 5/2005 | |
| JP | 2005-184225 A | | 7/2005 | |
| JP | 2005184225 A | * | 7/2005 | |
| JP | 2005-335410 A | | 12/2005 | |
| JP | 2005335410 A | * | 12/2005 | |
| JP | 2006-135797 A | | 5/2006 | |
| JP | 2008-015759 A | | 1/2008 | |
| JP | 2008015759 A | * | 1/2008 | ............... B60R 1/00 |
| JP | 2008-230558 A | | 10/2008 | |
| JP | 2009-100180 A | | 5/2009 | |
| JP | 2009100180 A | * | 5/2009 | |
| JP | 2010-208540 A | | 9/2010 | |
| JP | 4888831 B2 | | 2/2012 | |
| WO | WO 2011155878 A1 | * | 12/2011 | ............. A61B 3/113 |

OTHER PUBLICATIONS

International Search Report for PCT/JP2014/057202 dated Jun. 10, 2014 [PCT/ISA/210].
Written Opinion for PCT/JP2014/057202 dated Jun. 10, 2014 [PCT/ISA/237].
Communication dated Oct. 10, 2017 issued by the Japanese Patent Office in application No. 2013-074917.

* cited by examiner

F I G. 15
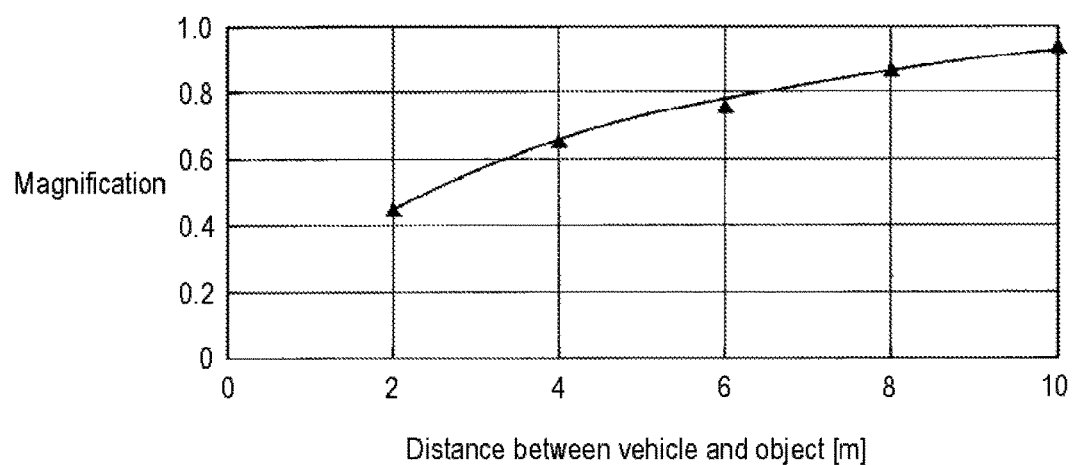

IMAGE DISPLAY CONTROL APPARATUS, IMAGE DISPLAY SYSTEM AND DISPLAY UNIT FOR DISPLAYING REAR-VIEW IMAGE BASED ON EYE POINT OF A DRIVER OR ANGLE OF A DISPLAY DEVICE

CROSS REFERENCE TO RELATED APPLICATIONS

This application is a National Stage of International Application No. PCT/JP2014/057202 filed Mar. 17, 2014, claiming priority based on Japanese Patent Application No. 2013-074917 filed Mar. 29, 2013, the contents of all of which are incorporated herein by reference in their entirety.

TECHNICAL FIELD

An embodiment of the present invention relates to an image display control apparatus, an image display system and a display unit.

BACKGROUND ART

Conventionally, a mirror-integrated display unit where a mirror provided inside a vehicle cabin and display devices provided at both left and right sides of the mirror is known.

DOCUMENT OF PRIOR ART

Patent Document

Patent document 1: JP2008-230558A

OVERVIEW OF INVENTION

Problem to be Solved by Invention

In an apparatus of the aforementioned type, as an example, it is desirable that an image displayed at the display device is effectively utilized.

Means for Solving Problem

An image display control apparatus according to an embodiment of the present invention includes, as an example, an image generation portion generating an output image which resembles a map of a room mirror using at least a vehicle outside image based on at least one of a detection result of an eye point position acquisition portion detecting a position of an eye point of a driver and a detection result of an angle acquisition portion detecting an angle of a display device, and a display control portion controlling the display device so that the display device displays the output image generated by the image generation portion. Accordingly, in the present embodiment, as an example, the output image similar to the map of the room mirror may be displayed at the display device.

In the image display control apparatus according to the embodiment of the present invention, as an example, the image generation portion specifies a portion of the vehicle outside image that is generated to be the output image. Thus, according to the present embodiment, as an example, the display range of the display device may be relatively easily changed.

The image display control apparatus according to the embodiment of the present invention includes, as an example, an imaging range control portion controlling an imaging range of an imaging portion that captures the vehicle outside image to be changed on a basis of at least one of the detection result of the eye point position acquisition portion detecting the position of the eye point of the driver and the detection result of the angle acquisition portion detecting the angle of the display device. Thus, according to the present embodiment, as an example, the image with less inconvenience may be obtainable from the image capturing the range conforming to the position of the eye point of the driver or the angle of the display device.

In the image display control apparatus according to the embodiment of the present invention, as an example, the image generation portion changes a size of an image of an object included in the output image depending on a position of the object detected by an object detection portion detecting the object at a vehicle exterior. Thus, according to the present embodiment, as an example, the size of the image of the object at the vehicle exterior may be accurately displayed at the display device.

In the image display control apparatus according to the embodiment of the present invention, as an example, a display screen of the display device is covered by a half mirror, and the display control portion controls the display device so that the display device displays the output image with a luminance with which the half mirror is in a fully transmissive state. Thus, in the present embodiment, as an example, an occurrence of an event where the image or the map is less visible because of a difference between the output image of the display device and the map of the half mirror may be restrained.

In the image display control apparatus according to the embodiment of the present invention, as an example, a display screen of the display device is covered by a half mirror, the image generation portion generates the output image indicating a scene at a vehicle exterior, and the display control portion controls the display device so that the display device displays the output image with a luminance with which the half mirror is in a half transmissive state. Thus, according to the present embodiment, as an example, it is capable of overlapping the vehicle inside image by the map of the half mirror with the vehicle outside image output from the display device.

In the image display control apparatus according to the embodiment of the present invention, as an example, a display screen of the display device is covered by a half mirror, and a luminance change portion is provided to increase a luminance of the display device or a luminance value of the output image in association with an increase of a brightness at a vehicle interior detected by a brightness detection portion detecting the brightness at the vehicle interior within a range where a transmission state at the half mirror is maintained in at least one of the fully transmissive state and the half transmissive state. Accordingly, in the present embodiment, as an example, the image or the map may be restrained from being less visible because of the change of the transmission state of the half mirror depending on the change of the brightness at the vehicle interior.

In the image display control apparatus according to the embodiment of the present invention, as an example, a display screen of the display device is covered by a half mirror, and the image generation portion generates the output image corresponding to a region of a window of a vehicle within a map of the half mirror. Thus, in the present embodiment, as an example, the vehicle outside image viewed from the window may be clearly visually recognized.

In the image display control apparatus according to the embodiment of the present invention, as an example, a display screen of the display device is covered by a half mirror, and the display control portion is configured to control the display device so that at least the fully transmissive state of the half mirror and the half transmissive state of the half mirror are switchable. Accordingly, in the present embodiment, as an example, the image conforming to a driving condition or a preference of the driver, for example, may be likely to be displayed at the display device.

An image display system according to the embodiment of the present invention includes, as an example, the aforementioned image display control apparatus and an imaging portion capturing a scene at a vehicle interior or a vehicle exterior. Accordingly, in the present embodiment, as an example, the output image similar to the map of the room mirror may be displayed at the display device.

A display unit according to the embodiment of the present invention includes, as an example, the aforementioned display device included in the aforementioned image display control apparatus and a half mirror covering a display screen of the display device. Thus, according to the present embodiment, as an example, the driver may confirm a rear side using the half mirror in a state where the display device cannot be used.

BRIEF DESCRIPTION OF DRAWINGS

FIG. 15 is a graph showing an example of a correlation between a distance between a vehicle and an object and a magnification of an image of the aforementioned object in the image display system according to the embodiment.

MODE FOR CARRYING OUT THE INVENTION

Embodiment

Figure 1:
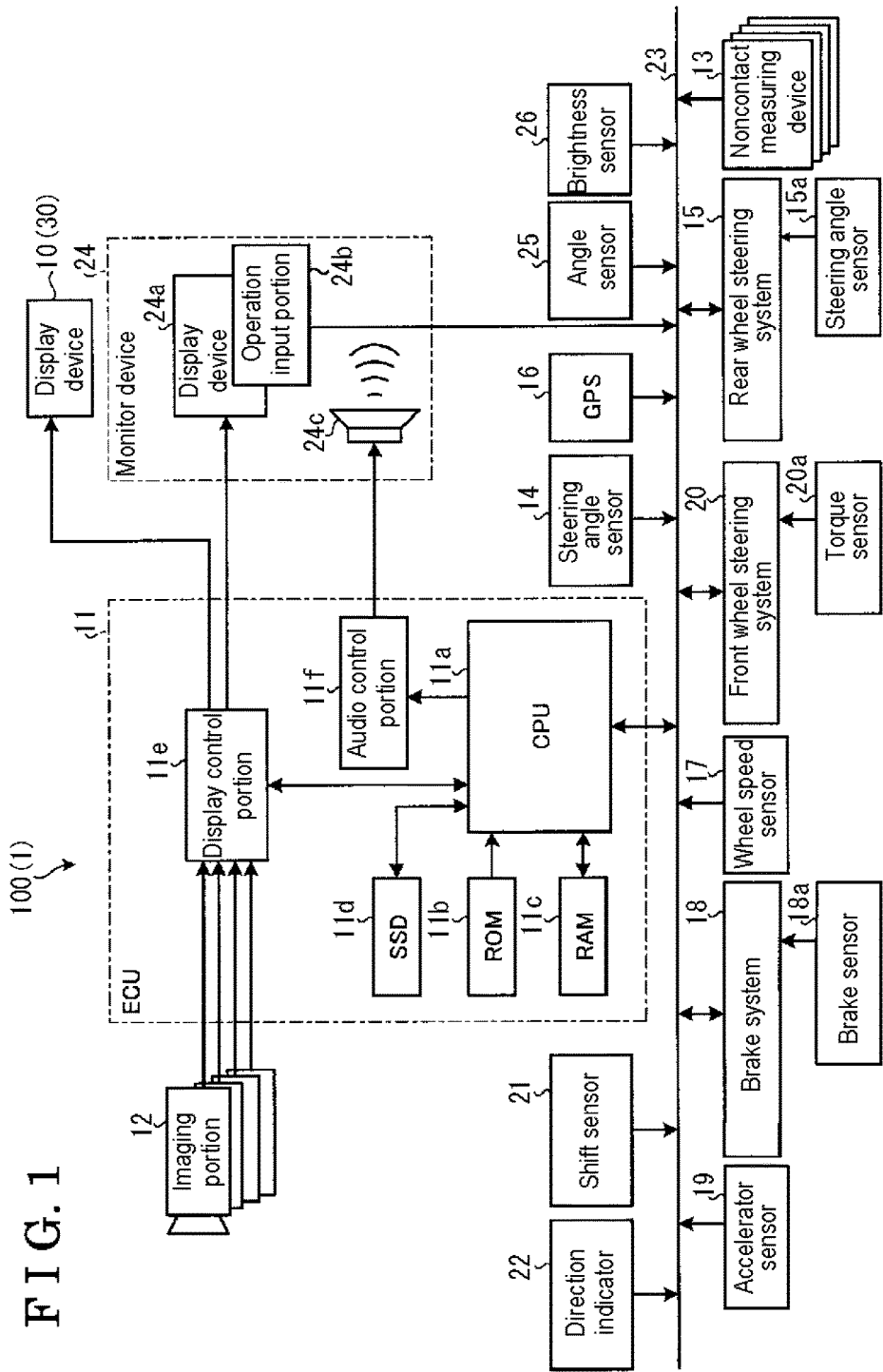
FIG. 1 is a schematic structural view of an example of an image display system according to an embodiment.

An embodiment and alternative examples as below include the similar components to one another. Thus, in the following, the similar components bear the common reference numerals. In addition, duplicated explanation is omitted.

In the present embodiment, as an example, an image display system 100 mounted at a vehicle 1 includes an ECU 11 (electronic control unit, control portion, image display control apparatus) controlling an image displayed at a display device 10 as illustrated in FIG. 1.

Figure 2:
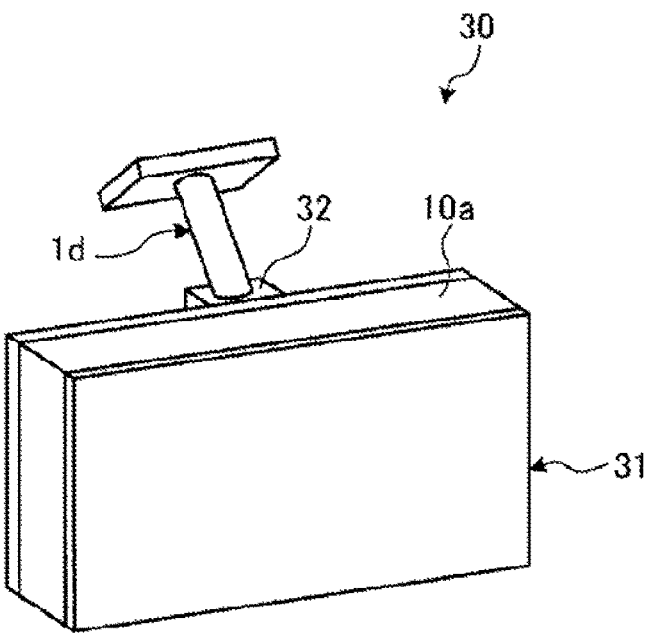
FIG. 2 is a perspective view of an example of a display unit included in the image display system according to the embodiment.
Figure 3:
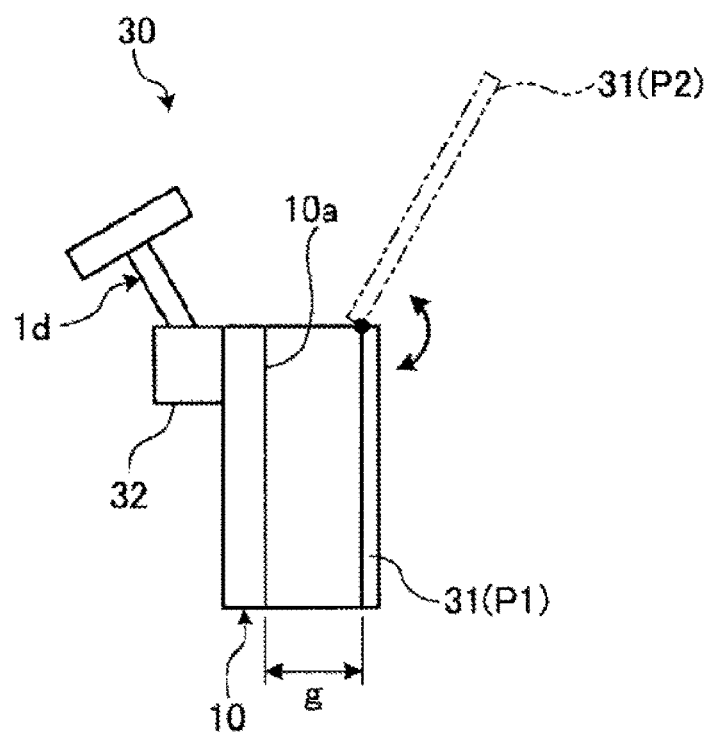
FIG. 3 is a side view of the example of the display unit included in the image display system according to the embodiment.
Figure 4:
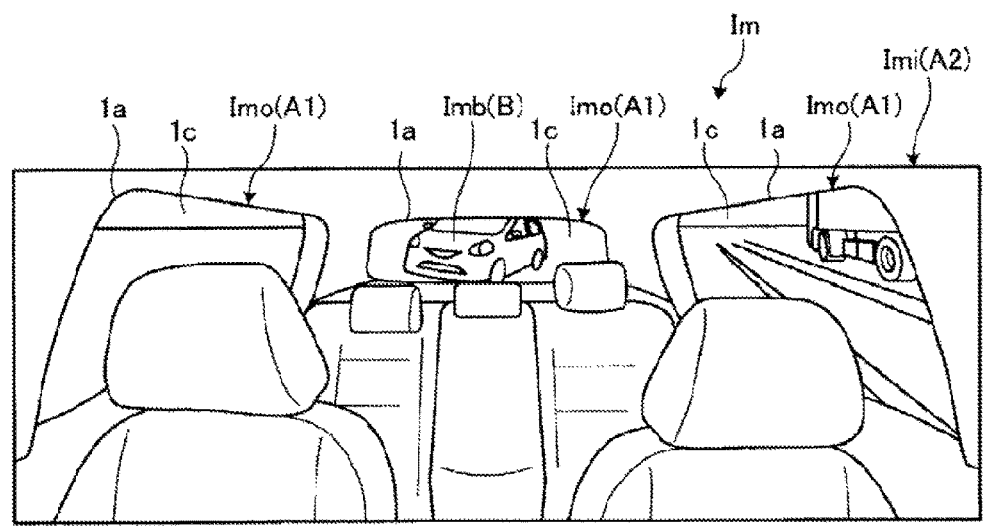
FIG. 4 is an example of an image (output image, transmission rate=0) displayed at a display device of the image display system according to the embodiment.
Figure 5:
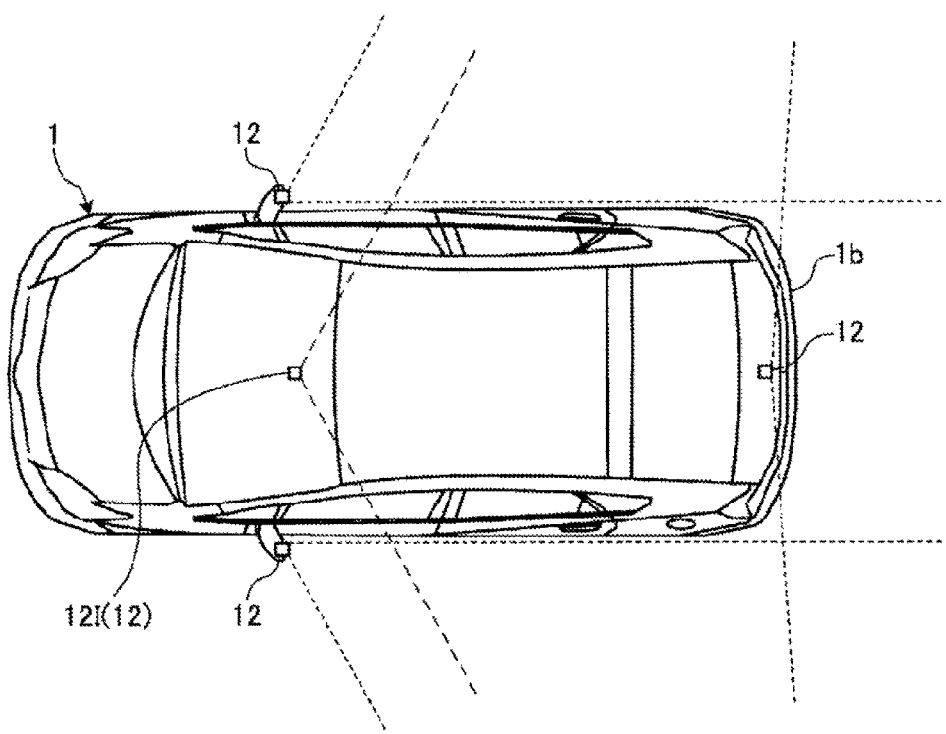
FIG. 5 is a plan view of an example of an imaging range by an imaging portion of the image display system according to the embodiment.
Figure 6:
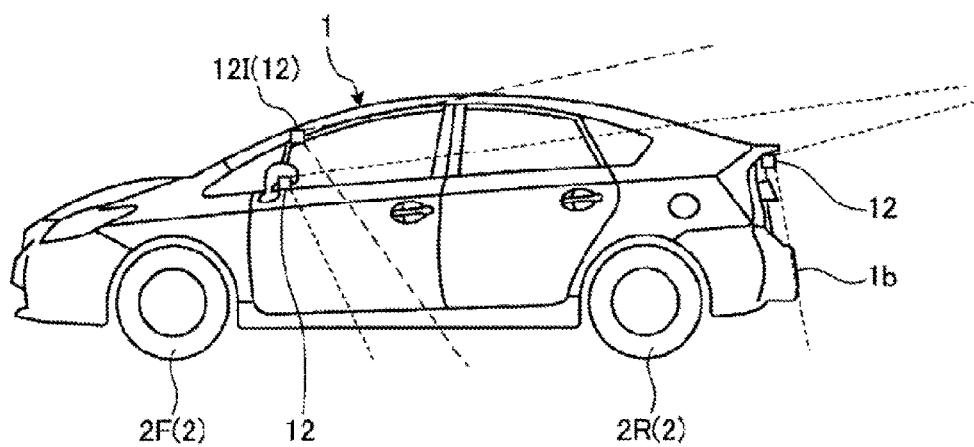
FIG. 6 is a side view of the example of the imaging range by the imaging portion of the image display system according to the embodiment.
Figure 7:
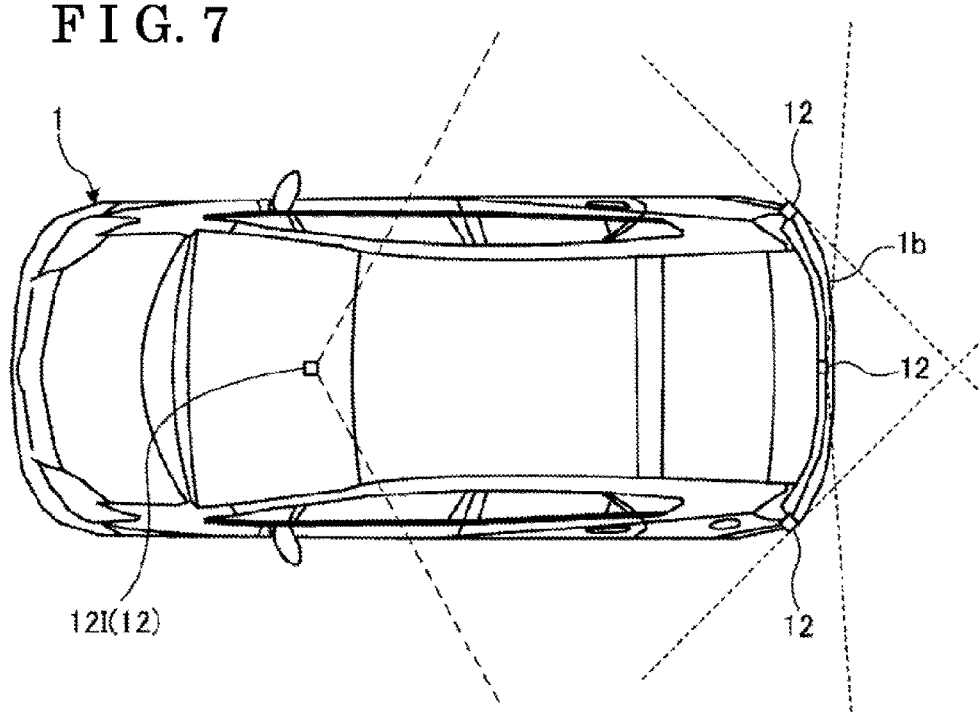
FIG. 7 is a plan view of another example of the imaging range by the imaging portion of the image display system according to the embodiment.
Figure 8:
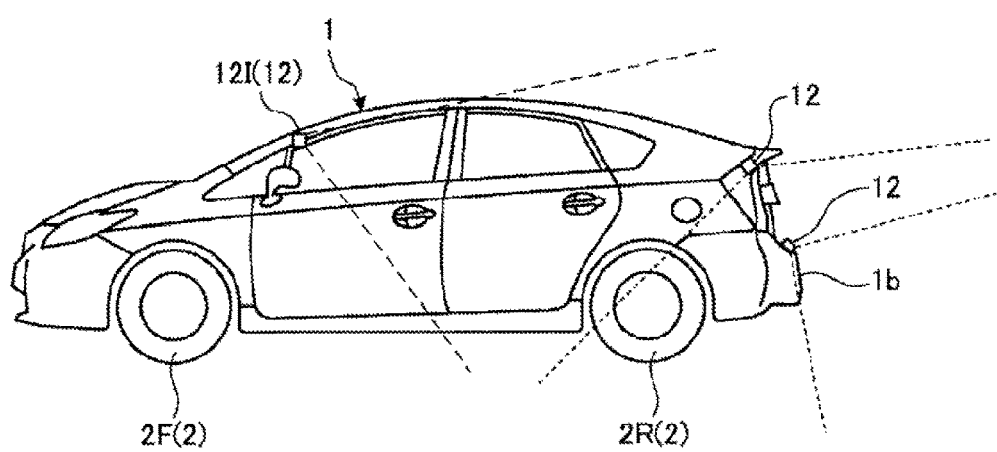
FIG. 8 is a side view of another example of the imaging range by the imaging portion of the image display system according to the embodiment.

In the embodiment, as an example, a display unit 30 (display device, mirror unit, rearview unit) is provided as illustrated in FIGS. 2 and 3 as a replacement for a room mirror (rearview mirror) for rearward recognition. The display unit 30 includes the display device 10 (display panel), a half mirror 31 and a connection portion 32. The display device 10 includes a display screen 10a facing a substantially rearward of the vehicle. The display device 10 forms an appearance in a square shape (rectangular shape) elongated in a left-right direction (vehicle width direction) in a front view. The display device 10 is configured in a flat rectangular parallelepiped shape. The display device 10 is, as an example, a LCD (liquid crystal display), an OELD (organic electro-luminescent display) or the like. A left-right reverse image from an image captured by imaging portions 12 provided at a vehicle interior (inside a cabin) and a vehicle exterior (outside the cabin) is displayed at the display device 10. An image corresponding to (similar to, adopted to, matching or positioned to) a map reflected at the half mirror 31 is displayed at the display device 10 by an image processing of the ECU 11.

In addition, as illustrated in FIGS. 2 and 3, the half mirror 31 covers the display screen 10a of the display device 10. The half mirror 31 forms an appearance in a square shape (rectangular shape) elongated in the left-right direction (vehicle width direction) in a front view. The half mirror 31 is configured in a flat rectangular parallelepiped shape. In the present embodiment, as an example, the half mirror 31 is provided to form a clearance g with the display screen 10a. Because of the aforementioned clearance g, a projected image (image) on the display screen 10a of the display device 10 seems to be the map reflected at the half mirror 31. A support portion 1d is fixed to the vehicle 1 (for example, a roof panel not illustrated). The support portion 1d and the connection portion 32 are connected to be position changeable in a three-dimensional manner (rotatable and stoppable in each position) via a ball joint mechanism (not illustrated), for example. An angle sensor 25 (for example, gyro sensor, refer to FIG. 1, not illustrated in FIG. 2 or 3) detecting an angle of the display device 10 (display unit 30) in three dimensions is provided at the connection portion 32. The half mirror 31 is reciprocable (capable of opening and closing) between a covering position P1 (first position) covering the display screen 10a of the display device 10 and an opening position P2 (second position, separate position) inhibited from covering the display screen 10a and separating from the display screen 10a. In addition, the half mirror 31 is configured to hold and stop at least at each of the positions P1 and P2. That is, a driver moves the half mirror 31 with ones' finger, for example, so that the half mirror 31 moves to the opening position P2. As a result, the driver can visually confirm the image displayed on the display screen 10a not via the half mirror 31.

The display unit 30 according to the present embodiment is usable in various modes obtained by combination of the half mirror 31 and the display device 10. For example, there is a mode (fully-transmissive mode) where the image is displayed at the display device 10 with a relatively high luminance and the half mirror 31 is brought to a fully transmissive state so that the half mirror 31 is not used as a mirror. In addition, there is a mode (full reflection mode, mirror mode) where the image is not displayed at the display device 10 and the half mirror 31 is used as the mirror. Further, there is a mode (half-transmissive mode) where the image is displayed at the display device 10 while light is reflected at the half mirror 31. In the half-transmissive mode, the luminance of the image may locally (for example, only a region corresponding to an inside of a window frame 1a) increase (locally highlighted mode). In the following, unless otherwise specified, an explanation is made on a calculation processing in the fully-transmissive mode.

In the fully-transmissive mode, as an example, the image (output image Im) displayed at the display device 10 includes a vehicle inside image Imi indicating a scene at the vehicle interior (image at the inside of the vehicle including a passenger, luggage, goods, and the like in addition to a pillar, a door, a seat, a trim and a roof, for example) and a vehicle outside image Imo indicating a scene at the vehicle exterior at a portion corresponding to a window 1c (within the window frame 1a). The vehicle inside image Imi is acquired by an imaging portion 12I (12) provided at the vehicle interior as illustrated in FIGS. 5 to 8. The imaging portion 12 is, for example, a digital camera incorporating an imaging element such as a CCD (charge coupled device), a CIS (CMOS image sensor) and the like. The imaging portion 12 may output image data (moving image data, frame data) at a predetermined frame rate. In the present embodiment, as an example, a relatively wide range at the vehicle interior is captured by the imaging portion 12I (12) at the vehicle interior so that the vehicle inside image Imi for each position within the relatively wide range at the vehicle interior is displayed at the display device 10. One or plural imaging portion(s) 12I (12) may be provided at the vehicle interior. As an example, the imaging portion 12I (12) is disposed at a front portion of the vehicle interior so as to be provided in the vicinity of the display device 10 or integrally with the display device 10. In a case where the plural imaging portions 12 are provided at the vehicle interior, the ECU 11 (control portion) combines the images acquired by the plural imaging portions 12.

The vehicle outside image Imo is acquired by the plural imaging portions 12 at the vehicle exterior. The ECU 11 combines the images acquired by the plural imaging portions 12 by a known technique to thereby obtain the continuous vehicle outside image Imo (panorama image, refer to FIG. 12). In the present embodiment, as an example, the plural imaging portions 12 at the vehicle exterior capture a relatively wide range at a rear side of the vehicle 1 so that the vehicle outside image Imo for each position within the relatively wide range at the vehicle exterior may be displayed at the display device 10. In the example illustrated in FIG. 5 or 6, the imaging portions 12 at the vehicle exterior are provided at opposed side portions (left and right door mirrors, as an example) of the vehicle 1 (vehicle body) and at a rear end portion 1b of the vehicle 1, respectively. In the example illustrated in FIG. 7 or 8, the imaging portions 12 at the vehicle exterior are provided at opposed side portions (relatively upper side of corner portions at the rear side of the vehicle 1, as an example) and at the rear end portion 1b of the vehicle 1, respectively. In addition, respective imaging ranges of the imaging portions 12 may be differentiated up and down.

Figure 9:
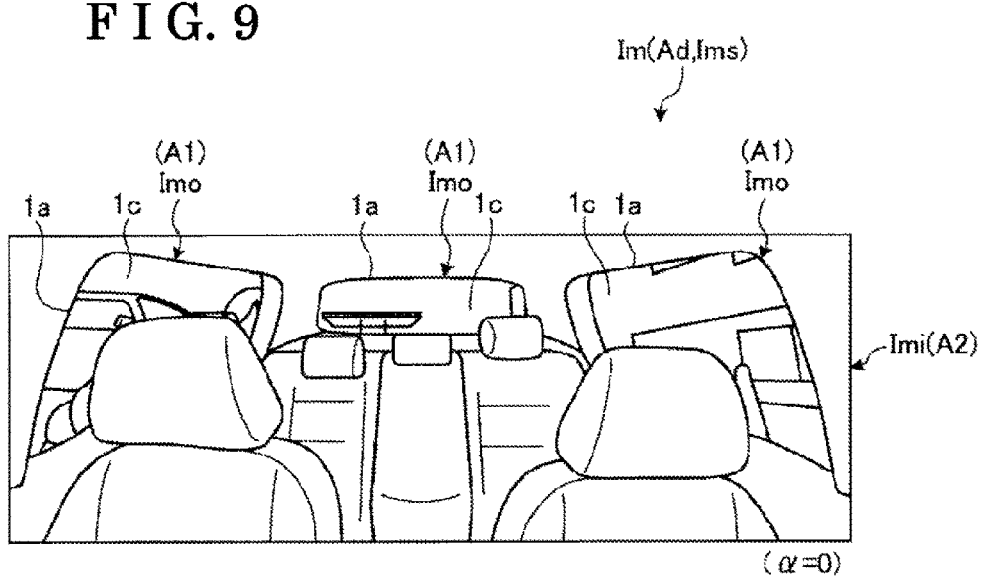
FIG. 9 is an example of the image (output image) displayed at the display device of the image display system according to the embodiment and is a diagram in a state where the transmission rate is 0.
Figure 10:
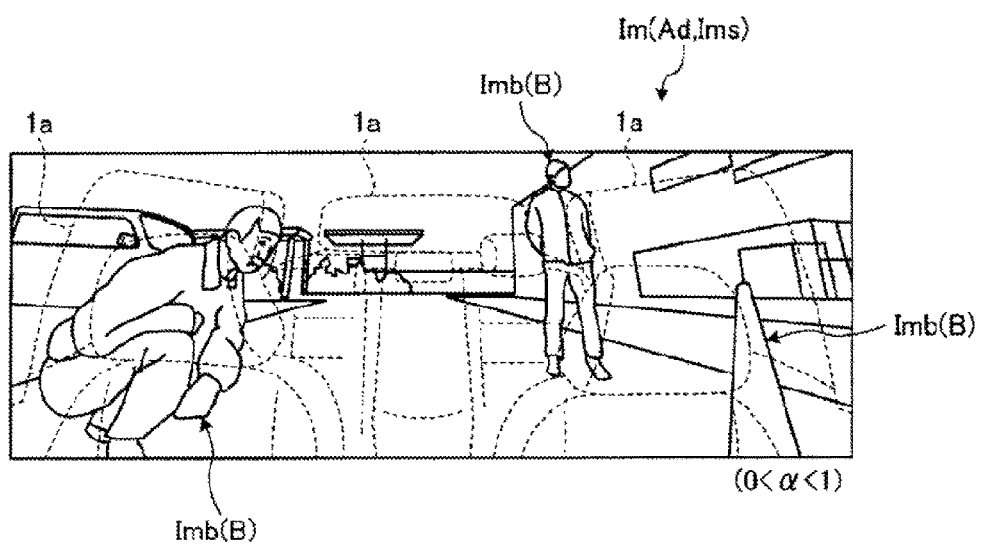
FIG. 10 is the example of the image (output image) displayed at the display device of the image display system according to the embodiment and is a diagram in a state where the transmission rate is greater than 0 and smaller than 1.
Figure 11:
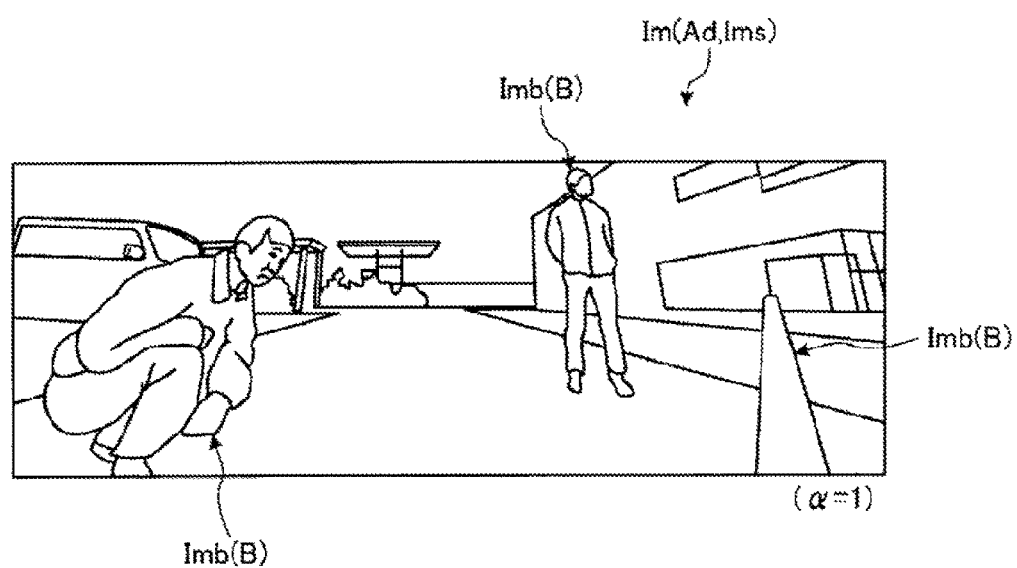
FIG. 11 is the example of the image (output image) displayed at the display device of the image display system according to the embodiment and is a diagram in a state where the transmission rate is 1.

In the present embodiment, as an example, the ECU 11 superimposes (combines) the vehicle inside image Imi and the vehicle outside image Imo to generate a composite image Ims (see FIGS. 10 and 11) where a scene at the vehicle exterior is visible by passing through configurations of the vehicle interior (a pillar, a door, a seat, a trim, a roof, a passenger, luggage, goods and the like). In addition, as illustrated in FIGS. 9 to 11, the ECU 11 is capable of generating the composite image Ims in a manner that a transmission rate α (ratio) is differentiated. In FIG. 9, the composite image Ims with (α=0) (=vehicle inside image Imi) is illustrated. In FIG. 10, the composite image Ims with (0<α<1) is illustrated. In FIG. 11, the composite image Ims with (α=1) (=vehicle outside image Imo) is illustrated. In a relatively simple example, in a case where the luminance of the vehicle inside image Imi is x1, the luminance of the vehicle outside image Imo is x2, and the transmission rate is α (0≤α≤1), for each point in a state where the vehicle inside image Imi and the vehicle outside image Imo are adjusted in position, a luminance x of the composite image Ims superimposed at the aforementioned each point may satisfy x=(1−α)×x1+α×x2. As clearly understood from FIGS. 9 to 11, the aforementioned image composition is performed on a region except for the window 1c (region where a structure or an object, for example, is present at the vehicle interior) and is not performed on a region corresponding to the window 1c (region where a structure or an object, for example, is not present at the vehicle interior and a scene of the vehicle exterior is visible through the window 1c) (only the vehicle outside image Imo serves as the output image Im). The vehicle outside image Imo includes a continuous configuration at both the inside and the outside of the window 1c, however, the luminance of the vehicle outside image Imo may differ between the inside and the outside of the window 1c. The transmission rate α may be specified to any value.

Figure 12:
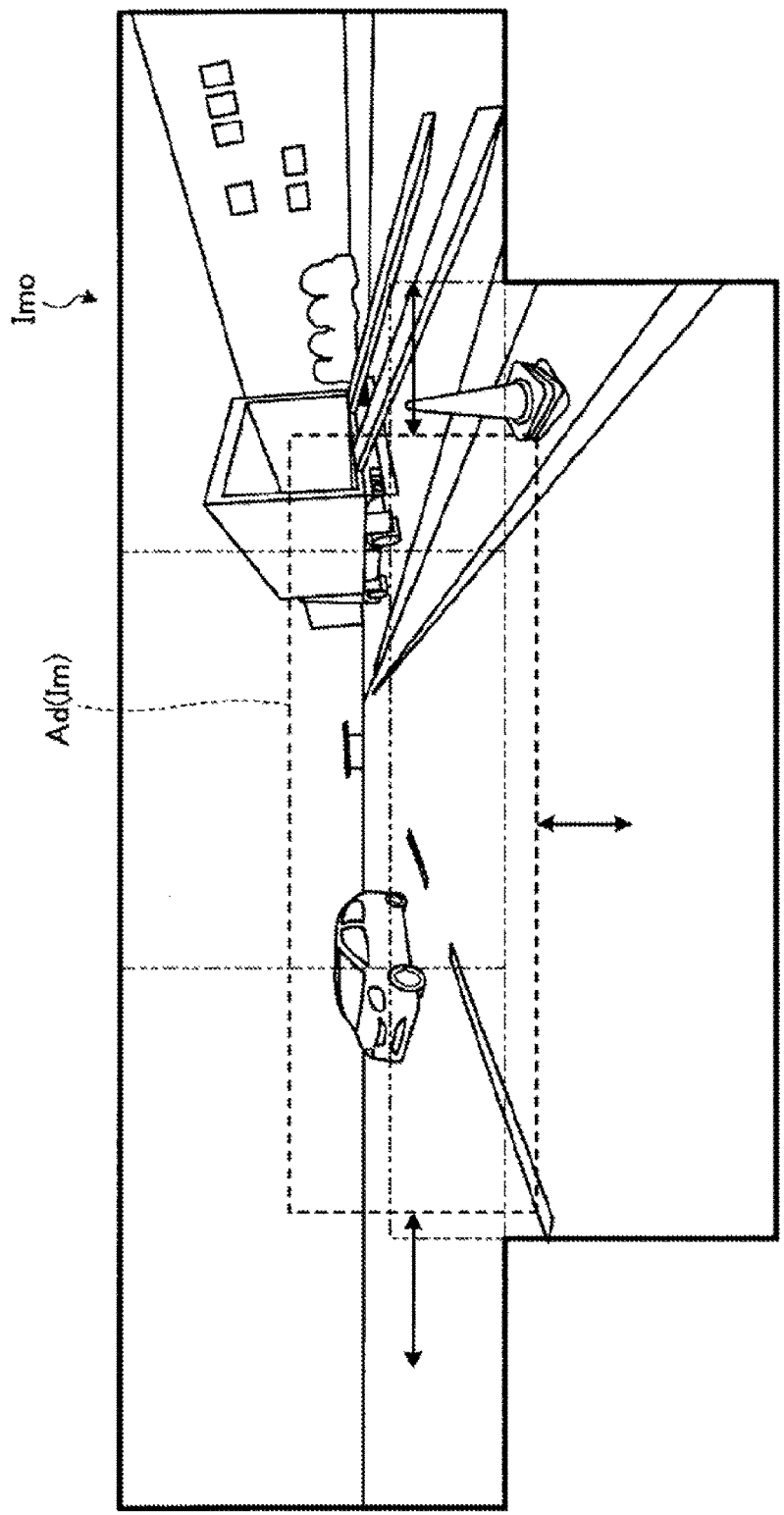
FIG. 12 is an explanatory view illustrating an example of a whole area and a display range of a vehicle outside image obtained by the image display system according to the embodiment.

Further, in the present embodiment, as an example, the ECU 11 may change a display range Ad in each of the vehicle inside image Imi and the vehicle outside image Imo. As an example, as illustrated in FIG. 12, the ECU 11 decides (moves) the display range Ad from the vehicle outside image Imo including a relatively wide range acquired from the imaging portions 12. The display range is also changeable for the vehicle inside image Imi.

In the present embodiment, as an example, the ECU 11 may change the transmission rate α or the display range Ad depending on a state of the vehicle 1. The ECU 11 may utilize detection results of various sensors as a trigger (signal, data) for changing the transmission rate α or the display range Ad. Specifically, for example, the ECU 11 may change the transmission rate α or the display range Ad depending on detection results, signals and data acquired from a noncontact measuring device 13, a steering angle sensor 14 (for front wheels), a steering angle sensor 15a of a rear wheel steering system 15, a GPS 16 (global positioning system), a wheel speed sensor 17, a brake sensor 18a of a brake system 18, an accelerator sensor 19, a torque sensor 20a of a front wheel steering system 20, a shift sensor 21, a direction indicator 22 and the like illustrated in FIG. 1, instruction signals (control signal, switch signal, operation signal, input signal, data) of an operation input portion 24b (monitor device 24) and the like, a detection result of an object detection portion 119 (see FIG. 16), and a position of the vehicle 1 acquired by a vehicle position acquisition portion 120 (see FIG. 16), for example. As illustrated in FIG. 1, electric components included in the image display system 100 (i.e., the noncontact measuring device 13, the steering angle sensor 14, the steering angle sensor 15a, the GPS 16, the wheel speed sensor 17, the brake sensor 18a, the accelerator sensor 19, the torque sensor 20a, the shift sensor 21, the direction indicator 22, the operation input portion 24b, and the like) are electrically connectable via an in-vehicle network 23 (for example, CAN (controller area network)) as an example. Each of the electric components may be electrically connected via other than CAN.

The noncontact measuring device 13 (distance surveying portion, object detection device) is, for example, a sonar (sonar sensor, ultrasonic detector) that discharges an ultrasonic wave or an electric wave to capture a reflected wave thereof or a radar, for example. The ECU 11 may determine whether or not an object B (obstacle, see FIG. 20) is positioned in surroundings of the vehicle 1 or measure a distance from the object B. That is, the noncontact measuring device 13 is an example of an object detection portion.

The steering angle sensor 14 is a sensor that detects a steering amount (rotation angle) of a steering portion (steering wheel as an example, not illustrated) and is configured using a Hall element, for example. The steering angle sensor 15a is a sensor detecting a steering amount (rotation angle) of a rear wheel 2R (see FIG. 6) and is configured using a Hall element, for example.

The wheel speed sensor 17 is a sensor detecting a rotation amount or the number of rotations per unit time of a wheel 2 (see FIG. 6, front wheel 2F or rear wheel 2R) and is configured using a Hall element, for example. The ECU 11 may calculate a moving amount of the vehicle 1, for example, based on data acquired from the wheel speed sensor 17. The wheel speed sensor 17 may be provided at the brake system 18.

The brake system 18 is an ABS (anti-lock brake system) restraining a lock of a brake, a skid prevention system (ESC: electronic stability control) restraining a skid of the vehicle 1 when the vehicle 1 turns a corner, an electric brake system enhancing a brake force (performing a brake assist), a BBW (brake by wire) or the like. The brake system 18 applies a braking force to the wheel 2 (vehicle 1) via an actuator (not illustrated). The brake sensor 18a is a sensor detecting an operation amount of a brake pedal.

The accelerator sensor 19 is a sensor detecting an operation amount of an accelerator pedal. The torque sensor 20a detects torque applied by the driver to the steering portion. The shift sensor 21 is a sensor (switch) detecting a position of a movable portion (a lever, an arm, a button and the like, not illustrated) of a transmission operating portion and is configured using a displacement sensor, for example. Configurations, layouts, electric connection methods and the like of the aforementioned various sensors and actuators are examples and may be variously specified (changed). The direction indicator 22 outputs a signal instructing a light for direction indication to turn on (blink).

At the vehicle interior, a display device 24a different from the display device 10 and an audio output device 24c are provided. The display device 24a is a LCD or an OELD, for example. The audio output device 24c is a speaker, for example. The display device 24a is covered by the clear operation input portion 24b (for example, touch panel and the like). The passenger and the like may visually confirm the projected image (image) on a display screen of the display device 24a via the operation input portion 24b. The passenger and the like may perform an operation input (instruction input) by operating the operation input portion 24b, i.e., touching, pressing or moving the operation input portion 24b with one's finger, for example, at a position corresponding to the projected image (image) displayed on the display screen of the display device 24a. The display device 24a, the operation input portion 24b, the audio output device 24c and the like are provided at the monitor device 24 positioned at a center portion of a dashboard in the vehicle width direction (left-right direction). The monitor device 24 may include an operation input portion (not illustrated) such as a switch, a dial, a joy-stick and a pressing button, for example. The monitor device 24 may be shared by a navigation system and an audio system. The same image may be displayed at the display device 24a of the monitor device 24 as the display device 10.

The ECU 11 includes, as an example, a CPU 11a (central processing unit), a ROM 11b (read only memory), a RAM 11c (random access memory), a SSD 11d (solid state drive, flush memory), a display control portion 11e, an audio control portion 11f, and the like. The CPU 11a may perform various calculations. The CPU 11a may read out program stored (installed) at a nonvolatile memory device such as the ROM 11b and the SSD 11d, for example, and perform the calculation processing based on the aforementioned program. The RAM 11c tentatively stores various data used for the calculations at the CPU 11a. The SSD 11d is a rewritable nonvolatile memory portion that is able to store data even in a case where a power source of the ECU 11 is turned off. The display control portion 11e mainly performs, within the calculation processing at the ECU 11, the image processing using the image data obtained at the imaging portions 12 and the image processing (composition and the like, as an example) of the image data displayed at the display devices 10 and 24a. The audio control portion 11f mainly performs a processing of audio data output at the audio output device 24c within the calculation processing at the ECU 11. The CPU 11a, the ROM 11b, the RAM 11c and the like may be integrated within the same package. The ECU 11 may be configured to include other logic operation processor such as a DSP (digital signal processor) or a logic circuit, for example, than the CPU 11a. In addition, instead of the SSD 11d, a HDD (hard disk drive) may be provided. Further, the SSD 11d or the HDD may be provided separately from the ECU 11.

In the present embodiment, as mentioned above as an example, the display device 10 displays the output image Im corresponding to (similar to, adopted to, matching or positioned to) the map of the half mirror 31 by the image processing of the ECU 11. A function (conversion equation, conversion matrix and the like) for performing a coordinate conversion from the vehicle outside image Imo or the vehicle inside image Imi (including the image where the plural images are combined) into the output image Im corresponding to the map of the half mirror 31, a coefficient, a constant, data and the like are obtainable by practically acquiring positions of plural markers which are practically arranged at the vehicle exterior or the vehicle interior within the map of the half mirror 31 (by performing a calibration by imaging) or by performing a geometric calculation, for example.

Figure 13:
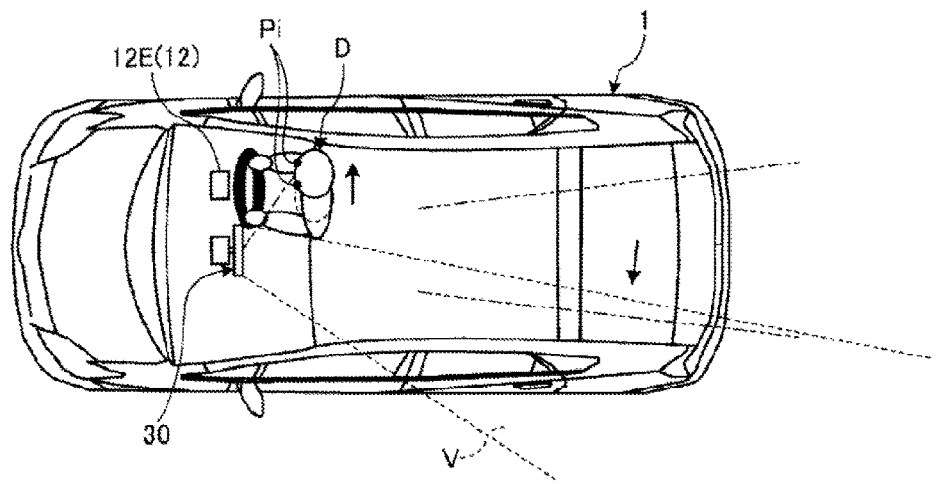
FIG. 13 is a schematic view of a change of a range viewed as a map of a half mirror (room mirror) corresponding to a change of a position of a driver's eye point in an example of the image display system according to the embodiment.

Further, in the present embodiment, as an example, the output image Im displayed at the display device 10 is changed by an eye point Pi (position of the eyes) of a driver D or by an angle (position) of the display unit 30. As mentioned above, the output image Im corresponding to the map of the half mirror 31 is displayed at the display device 10. The map of the half mirror 31 changes depending on the eye point Pi (position of the eyes) of the driver D or the angle (position) of the display unit 30. Thus, the output image Im of the display device 10 also changes depending on (in the same way as) the change of the map of the half mirror 31. That is, in a case where the eye point Pi moves to one side (right side as an example) in the left-right direction (vehicle width direction) as illustrated in FIG. 13, a region V captured at the map of the half mirror 31 viewed from the eye point Pi moves to the other side (left side) as compared before the movement of the eye point Pi. Thus, the ECU 11 controls the display device 10 so that the output image Im displayed at the display device 10 also moves to the other side (left side) as compared before the movement of the eye point Pi so as to conform to the map of the half mirror 31. The position of the eye point Pi may be acquired by a known image processing including a pattern matching and the like from the image of the face of the driver D captured by an imaging portion 12E (12). A function and the like indicating changes of the output image Im of the display device 10 in a case where the eye point Pi moves is obtainable by practically acquiring the positions of the plural markers which are practically arranged at the vehicle exterior or the vehicle interior within the map of the half mirror 31 (by performing a calibration by imaging) or by performing a geometric calculation, for example. In a case of movement in an opposite direction, a case of a different moving amount, or a case of movement in a front-rear direction, for example, the ECU 11 may calculate the change of the output image Im in the similar method.

Figure 14:
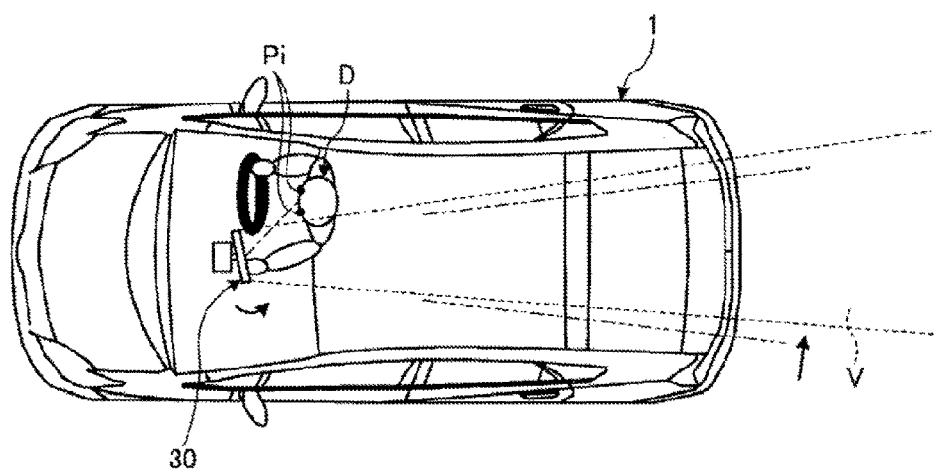
FIG. 14 is a schematic view of the change of the range viewed as the map of the half mirror (room mirror) corresponding to a change of an angle of the display unit in the example of the image display system according to the embodiment.

In a case where the display unit 30 rotates to face one side (right side as an example) in the left-right direction (vehicle width direction) as illustrated in FIG. 14, the region V captured in the map of the half mirror 31 moves to one side (right side) as compared before the movement of the eye point Pi. Thus, the ECU 11 controls the display device 10 so that the output image Im displayed at the display device 10 also moves to one side (right side) as compared before the movement of the eye point Pi so as to conform to the map of the half mirror 31. The rotation angle (rotation amount) of the display unit 30 is detectable by the angle sensor 25. A function and the like indicating the change of the output image Im of the display device 10 in a case where the position of the display unit 30 changes are obtainable by practically acquiring the positions of the plural markers which are practically arranged at the vehicle exterior or the vehicle interior within the map of the half mirror 31 (by performing a calibration by imaging) or by performing a geometric calculation, for example. In a case of movement in an opposite direction or a case of a different moving amount, for example, the ECU 11 may calculate the change of the output image Im in the same manner.

In a construction where the half mirror 31 is not provided, it is assumed, for example, that a mirror including a mirror surface is disposed at the position of the display screen 10a of the display device 10 and the output image Im corresponding to a map of the aforementioned mirror is displayed at the display device 10. According to the aforementioned construction and control, the driver may use the display device 10 (display unit 30) as a virtual room mirror. In addition, a function, a coefficient, a constant, data and the like used for the coordinate conversion or the calculation of the movement of the output image Im are stored at the nonvolatile memory portion such as the ROM 11b and the SSD 11d, for example.

In the present embodiment, as an example, the ECU 11 adjusts a size of an image Imb of the object B detected at the outside of the vehicle depending on the distance between the vehicle 1 and the object B. A function, a coefficient, a constant, data and the like related to the size adjustment are obtainable by practically acquiring the positions of the plural markers which are practically arranged at the vehicle exterior or the vehicle interior within the map of the half mirror 31 (by performing a calibration by imaging) or by performing a geometric calculation, for example. FIG. 15 illustrates an example of a coefficient for adjusting the size of the image Imb. The ECU 11 acquires, as an example, a coefficient K (magnification) corresponding to the distance to the object B based on a correlation in FIG. 15. The ECU 11 changes the size of the vehicle outside image Imo to the size obtained by multiplying the coefficient K.

Figure 16:
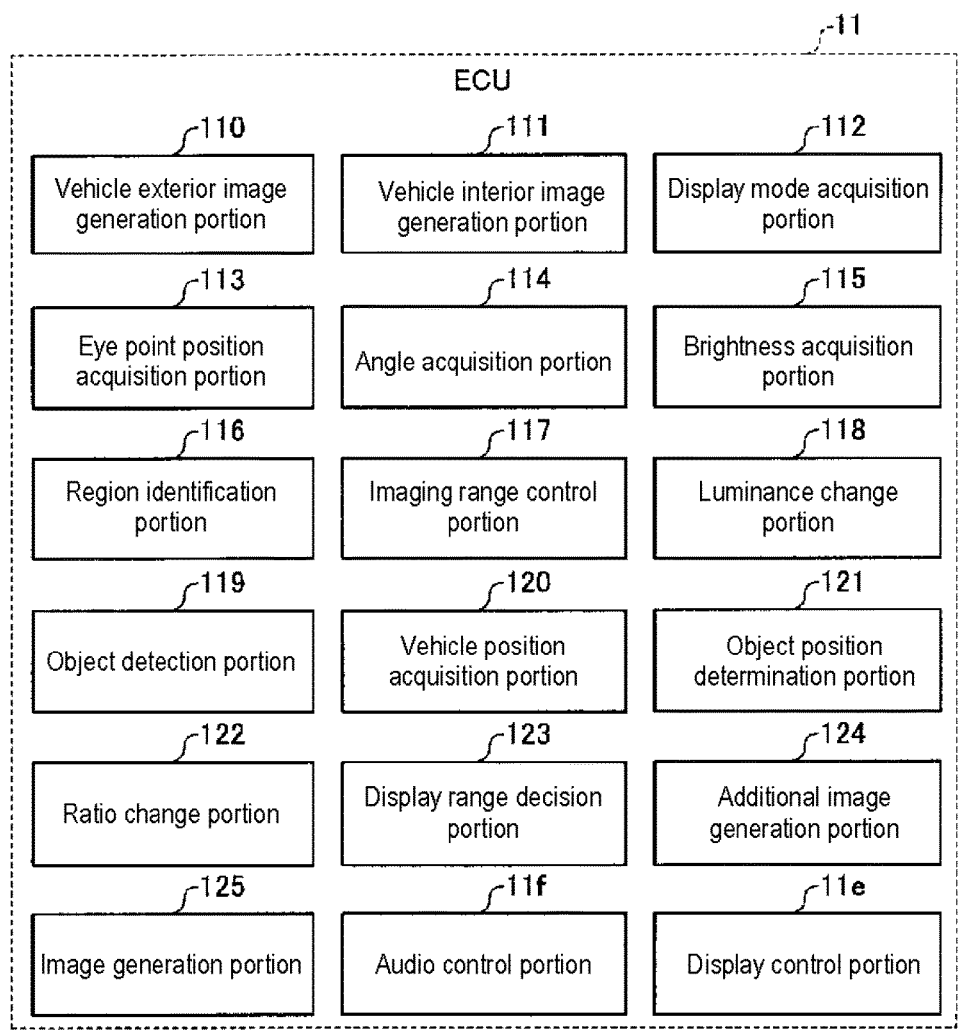
FIG. 16 is an example of a block diagram of a functional block of an ECU included in the image display system according to the embodiment.

In the present embodiment, as an example, the ECU 11 functions (operates) as at least a portion of the image display control apparatus that performs the aforementioned calculations in cooperation between hardware and software (program). That is, in the present embodiment, as an example, the ECU 11 functions (operates) as a vehicle outside image generation portion 110, a vehicle inside image generation portion 111, a display mode acquisition portion 112, an eye point position acquisition portion 113, an angle acquisition portion 114, a brightness acquisition portion 115, a region identification portion 116, an imaging range control portion 117, a luminance change portion 118, the object detection portion 119, the vehicle position acquisition portion 120, an object position determination portion 121, a ratio change portion 122, a display range decision portion 123, an additional image generation portion 124, an image generation portion 125 and the like as illustrated in FIG. 16, in addition to the display control portion 11e (see FIG. 1) and the audio control portion 11f (see FIG. 1). Here, the program may include, as an example, a module corresponding to each block illustrated in FIG. 16. The image processing may be performed at the CPU 11a besides the display control portion 11e.

The vehicle outside image generation portion 110 generates the continuous vehicle outside image Imo (panorama image) by connecting the plural (as an example, three in the present embodiment) images captured by the imaging portions 12 at the vehicle exterior by overlapping boundary portions of the images, as an example. The vehicle outside image generation portion 110 also generates the vehicle outside image Imo where the view from the eye point Pi is visually adjusted in position relative to the map of the half mirror 31 (or a mirror placed in substation for the display device 10) by performing the coordinate conversion of the vehicle outside image Imo, for example.

The vehicle inside image generation portion 111 generates the continuous vehicle inside image Imi (panorama image) in a case where the plural imaging portions 12I (12) are provided at the vehicle interior by connecting the plural (as an example, three in the present embodiment) images captured by the imaging portions 12I (12) at the vehicle interior by overlapping boundary portions of the images, as an example. The vehicle inside image generation portion 111 also generates the vehicle inside image Imi where the view from the eye point Pi is visually adjusted in position relative to the map of the half mirror 31 (or the mirror placed in substation for the display device 10) by performing the coordinate conversion of the vehicle inside image Imi, for example.

The display mode acquisition portion 112 acquires a display mode input (selected) by the operation input portion 24b or other operation, as an example.

The eye point position acquisition portion 113 calculates (determines or identifies) the position of the eye point by a known method from the image captured by the imaging portion 12E (12) for eye point detection, as an example.

The angle acquisition portion 114 calculates (determines or identifies) the position (angle) of the display unit 30 from the detection result of the angle sensor 25 (see FIG. 1), as an example.

The brightness acquisition portion 115 acquires (determines or identifies) the brightness at the vehicle interior from a detection result of a brightness sensor 26 (brightness detection portion, see FIG. 1) provided at a representative position (for example, at a roof in the vicinity of the display unit 30 and the like) at the vehicle interior (inside the cabin), as an example.

The region identification portion 116 distinguishes (separates or identifies) a first region A1 corresponding to the window 1c (within the window frame) in the vehicle inside image Imi and a second region A2 other than the first region A1 (corresponding to the outside of the window frame) in the vehicle inside image Imi by performing the image processing on the vehicle inside image Imi, as an example. Specifically, the region identification portion 116 may distinguish the first region A1 and the second region A2 by performing the image processing based on a difference in a luminance value (brightness) of a pixel, a color, or an existence of movement, for example. In addition, the position of the window frame 1a (a boundary between the first region A1 and the second region A2) acquired beforehand or the position of the window frame 1a which is identified at a previous calculation timing is stored at the memory portion such as the SSD 11d, for example, so that the boundary between the first region A1 and the second region A2 may be effectively detected in the vicinity of the position of the window frame 1a, i.e., the first region A1 and the second region A2 may be distinguished. In a case where an object such as a passenger and luggage, for example, overlaps the window, a region excluding the aforementioned object serves as the first region A1.

The imaging range control portion 117 may control the imaging portions 12 so that the direction (optical axis), position, zoom and the like of the imaging portion 12 are controlled to change the imaging range in a case where the imaging portion 12 includes a movable type or includes a construction where a zoom is switchable, as an example.

The luminance change portion 118 (brightness change portion, luminance value change portion) changes a total or local luminance (brightness, luminance value) of the output image Im displayed at the display screen 10a of the display device 10, as an example. The luminance change portion 118 may change the brightness (luminance value) of the output image Im and may change the luminance of the display device 10. In a case where the half mirror 31 is used, the change of the brightness (luminance value) of the output image Im or the luminance of the display device 10 causes a change of a transmission state at the half mirror 31. Thus, the luminance change portion 118 serves as an example of a transmission state change portion (transmission state switching portion) changing (switching) the transmission state of the half mirror 31.

The object detection portion 119 detects the object B (vehicle or human being, for example) by performing the image processing on the vehicle outside image Imo (for example, the vehicle outside image Imo generated at the vehicle outside image generation portion 110), as an example. In a case of detecting the object B, a pattern matching and the like may be used. In addition, the object detection portion 119 may detect the object B at the vehicle exterior from data obtained from the noncontact measuring device 13 and may detect the object B at the vehicle exterior from the result of the image processing of the vehicle outside image Imo and data obtained from the noncontact measuring device 13. Further, the object detection portion 119 may acquire the distance from the vehicle 1 to the object B from the result of the image processing of the vehicle outside image Imo or the data obtained from the noncontact measuring device 13.

The vehicle position acquisition portion 120 may acquire the position of the vehicle 1 based on data from the GPS 16, the detection result of the noncontact measuring device 13, a wheel speed detected by the wheel speed sensor 17, a steering angle detected by the steering angle sensors 14, 15a, the image processing result of the vehicle outside image Imo acquired by the imaging portions 12 and the like, as an example.

The object position determination portion 121 detects an object such as a human being and luggage, for example, included in the vehicle inside image Imi and determines (decides) that the aforementioned detected object is positioned at the inside of the vehicle or the outside of the vehicle by performing the image processing on the vehicle inside image Imi, as an example. For example, in a case where the position of the window frame 1a is stored at the memory portion, the object position determination portion 121 may determine that the detected object is at the outside of the vehicle when the image of the detected object only exists within the window frame 1a. On the other hand, in a case where the image of the detected object exists while crossing the window frame 1a, the object position determination portion 121 may determine that the detected object is positioned within the vehicle. Then, in a case where the object position determination portion 121 determines that the detected object is at the outside of the vehicle, the region identification portion 116 specifies a region where the image of the object at the outside of the vehicle exists as the first region A1. In a case where the detected object is determined as being at the inside of the vehicle, the region identification portion 116 specifies a region where the image of the object at the inside of the vehicle exists as the second region A2.

The ratio change portion 122 may change the transmission rate $\alpha$ based on the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 119, the position of the vehicle 1 acquired by the vehicle position acquisition portion 120 and the like, as an example.

The display range decision portion 123 may change the display range Ad based on the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 119, the position of the vehicle 1 acquired by the vehicle position acquisition portion 120 and the like, as an example.

The additional image generation portion 124 may add an additional image Ima (for example, an artificial image such as a highlight (for example, a frame and the like) of the object detected by the object detection portion 119 and a display of a lane, a line of a parking frame and the like (for example, a line and the like) to the output image Im, as an example.

The image generation portion 125, as an example, generates the output image Im including the composite image Ims (outside frame image) and the vehicle outside image Imo (inside frame image) at the first region A1 for at least the display range Ad displayed at the display device 10, the composite image Ims (outside frame image) where the vehicle inside image Imi at the second region A2 and the vehicle outside image Imo adjusted in position relative to the aforementioned vehicle inside image Imi and corresponding to the second region A2 are superimposed each other with the specified transmission rate $\alpha$ (ratio).

Figure 17:
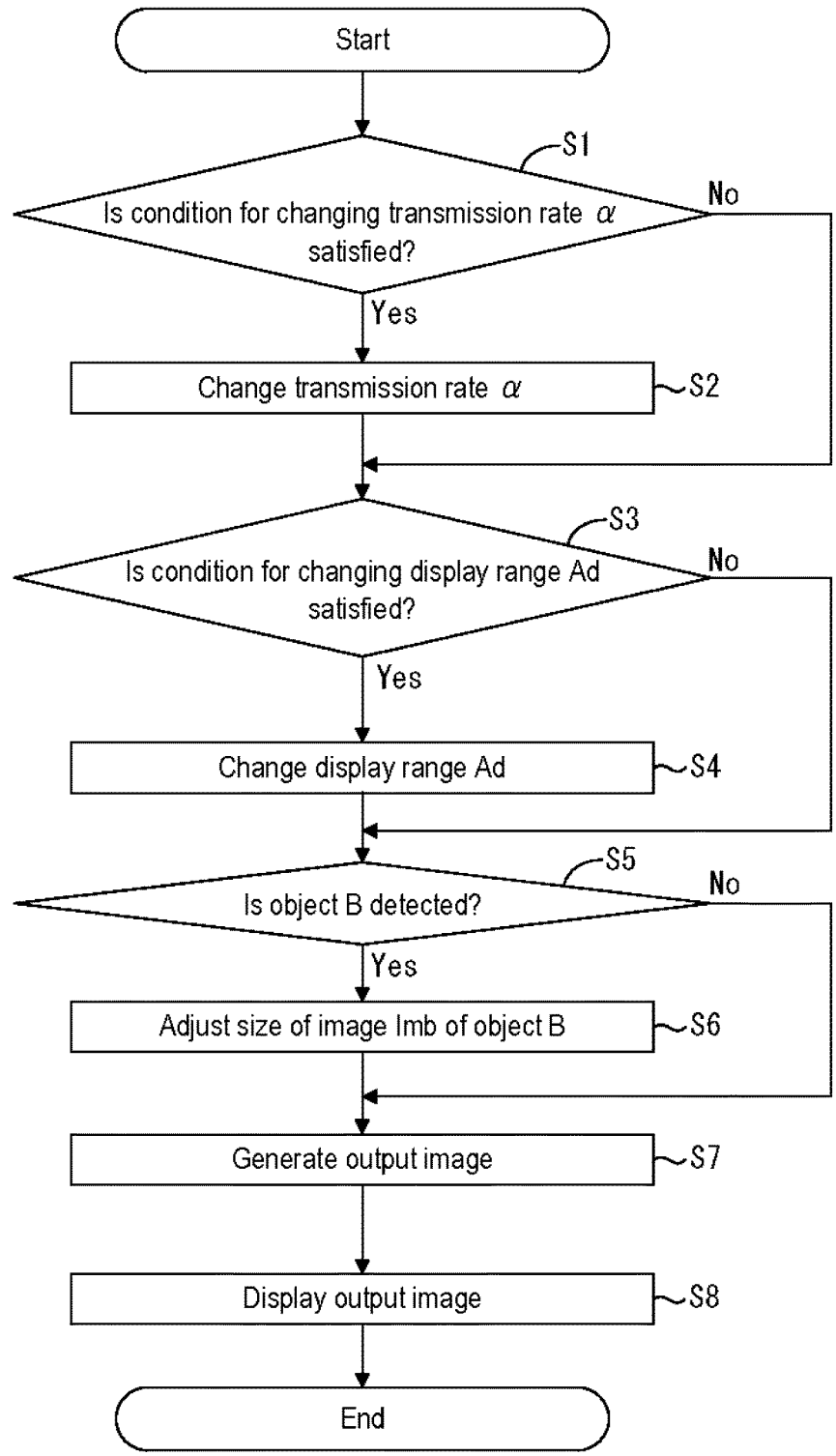
FIG. 17 is a flowchart showing an example of an operating procedure of the image display system according to the embodiment.

The image display system 100 according to the present embodiment may perform, as an example, a processing by procedures illustrated in FIG. 17. First, the ECU 11 acquires the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 119 and the like so as to compare the acquired results, signals, data and the like with reference values and determines whether or not a condition for changing the transmission rate $\alpha$ is satisfied (step S1). In a case where the condition for changing the transmission rate $\alpha$ is satisfied (Yes in step S1), the ECU 11 functions as the ratio change portion 122 and changes the transmission rate $\alpha$ based on the aforementioned condition (step S2). An example of step S2 is explained later. Next, the ECU 11 acquires the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 119, the position of the vehicle 1 acquired by the vehicle position acquisition portion 120, and the like so as to compare the acquired results, signals, data and the like with reference values and determines whether or not a condition for changing the display range Ad is satisfied (step S3). In a case where the condition for changing the display range Ad is satisfied (Yes in step S3), the ECU 11 functions as the display range decision portion 123 and changes the position or the size of the display range Ad based on the aforementioned condition (step S4). Next, the ECU 11 functions as the object detection portion 119 and detects the object B in the surroundings of the vehicle 1 (within a predetermined range) (step S5). In a case where the object B is detected (Yes in step S5), the size of the image Imb of the aforementioned object B is adjusted (step S6). The adjustment of the size of the image Imb corresponding to the object B may be performed on the vehicle outside image Imo or the output image Im. Then, the ECU 11 functions as the vehicle outside image generation portion 110, the region identification portion 116, the object position determination portion 121 and the like and functions as the image generation portion 125 to generate the output image Im conforming to the transmission rate $\alpha$ and the display range Ad which are specified (changed) (step S7). In step S7, the output image Im including the additional image may be generated. The display control portion 11e controls the display device 10 so that the generated output image Im is displayed (step S8).

Figure 18:
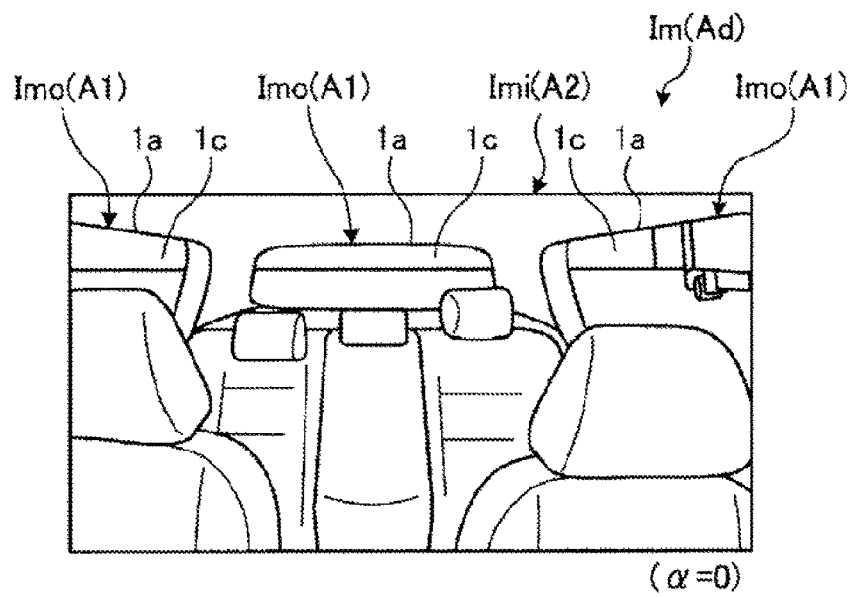
FIG. 18 is an example of the image (output image) displayed at the display device of the image display system according to the embodiment and is a diagram in a state before a lane change is performed.
Figure 19:
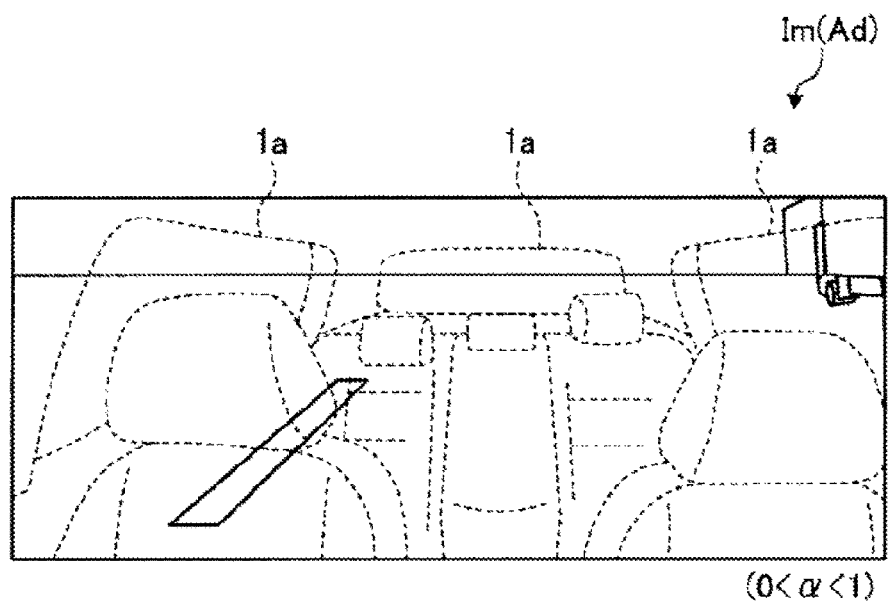
FIG. 19 is the example of the image (output image) displayed at the display device of the image display system according to the embodiment and is a diagram in a state where the lane change is performed.
Figure 20:
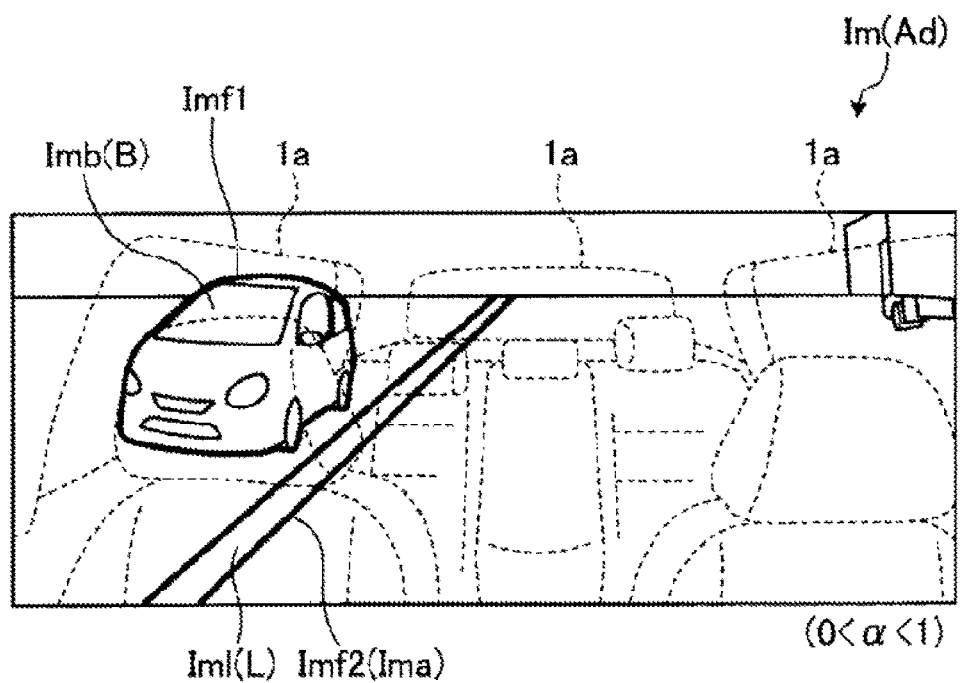
FIG. 20 is the example of the image (output image) displayed at the display device of the image display system according to the embodiment and is a diagram in a case where an object is detected at an outside of the vehicle in the state where the lane change is performed.

Each of FIGS. 18 and 19 illustrates, as an example, the output image Im (image displayed at the display device 10) in a case where the vehicle 1 changes lane to a left lane. In FIG. 18, the vehicle 1 is in a state travelling in a straight line. In this state, in the output image Im, the display range Ad is narrow and facing substantially straight rearward and the transmission rate α is 0 (zero). The ratio change portion 122 and the display range decision portion 123 acquire the detection results, signals and data obtained by each portion when the vehicle 1 makes a lane change so as to change the transmission rate α and the display range Ad in a case where the aforementioned detection results, signals and data satisfy predetermined conditions. In FIG. 19, in a case where a signal (signal obtained in association with a driving operation of the driver) from the direction indicator 22 instructing a movement in a leftward direction or a value (for example, the steering angle of each of the wheels 2, the position of the vehicle 1, the speed of the vehicle 1 and the like) of each portion (for example, the steering angle sensors 14, 15a, the wheel speed sensor 17, the torque sensor 20a and the like) related to the lane change of the vehicle 1 is obtained, the display range decision portion 123 expands the display range Ad of the output image Im laterally (left-right direction) and slides (moves) the display range Ad in a direction of the lane to which the vehicle moves. Thus, in the present embodiment, as an example, the driver may easily grasp the surroundings of the vehicle and the state outside the vehicle in a travelling direction. Further, in FIG. 19, the ratio change portion 122 increases the transmission rate α at the second region A2 to the extent of 0.6, for example. Thus, according to the present embodiment, as an example, the driver may further easily grasp the surroundings of the vehicle 1 and the state of the outside of the vehicle in the travelling direction because structures such as a pillar, a roof, a seat and a trim, for example, of the vehicle 1 are transparent. In addition, as illustrated in FIG. 20, in a case where the object B (vehicle) approaching within a predetermined distance at a rear left side of the vehicle 1 is detected by the object detection portion 119, as an example, the display range decision portion 123 may determine the display range Ad so as to include the image Imb of the aforementioned object B. In FIG. 20, the ratio change portion 122 may specify the transmission rate α to be higher than a case where the object B is not detected, as an example. Accordingly, the driver may easily visually recognize the object B and easily grasp the distance and relative position of the object B from the vehicle 1, for example. Further, in FIG. 20, as an example, the additional image generation portion 124 adds a highlight display Imf1 in a frame shape surrounding the image Imb of the detected object B to the image Imb and adds a highlight display Imf2 in a band shape overlapping an image Iml of a lane L of the road surface to the image Iml. Accordingly, in the present embodiment, as an example, the driver may further easily grasp the surroundings of the vehicle 1, the state of the outside of the vehicle in the travelling direction, the object B and the like. The aforementioned control may be performed in the same manner in a case where the vehicle changes lane in an opposite direction (right direction).

Figure 21:
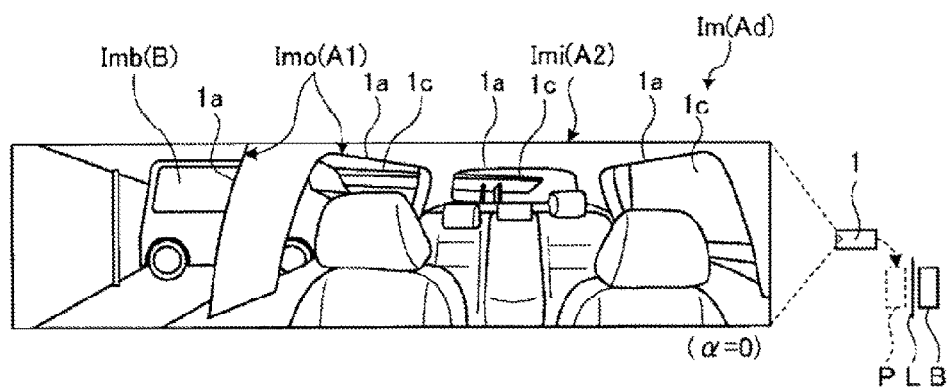
FIG. 21 is a schematic view illustrating a position of the vehicle at a time of parking and an example of the image (output image) displayed at the display device of the image display system at the aforementioned position, and is a diagram before the parking is started.
Figure 22:
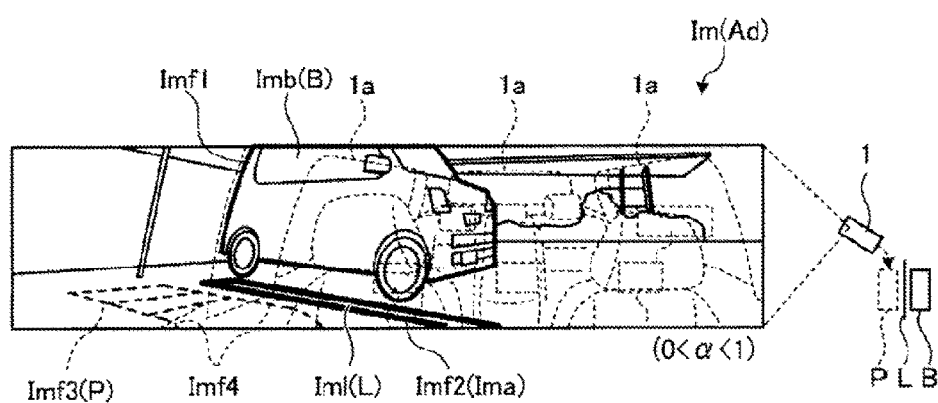
FIG. 22 is a schematic view illustrating the position of the vehicle at the time of parking and the example of the image (output image) displayed at the display device of the image display system at the aforementioned position, and is a diagram in a state before the vehicle reaches a target parking position.
Figure 23:
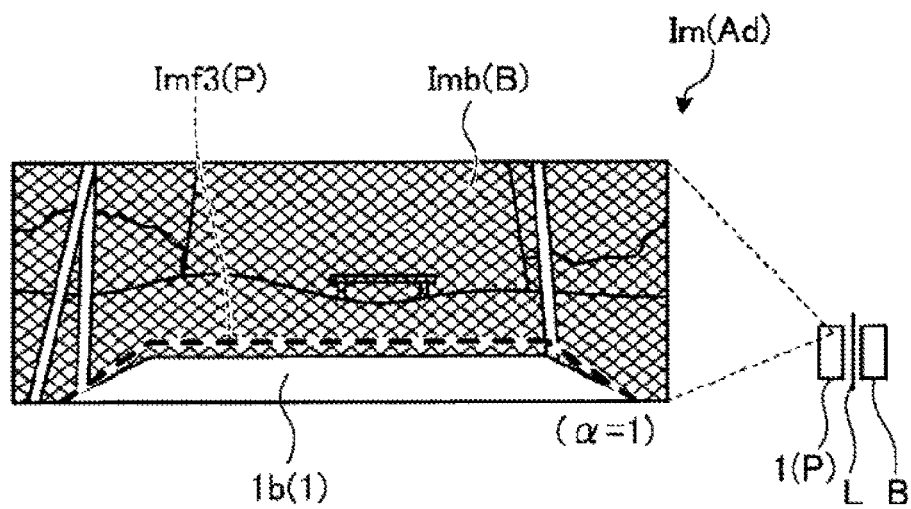
FIG. 23 is a schematic view illustrating the position of the vehicle at the time of parking and the example of the image (output image) displayed at the display device of the image display system at the aforementioned position, and is a diagram in a state where the vehicle is closer to the target parking position than the state in FIG. 22.

FIGS. 21 to 23 each illustrate, as an example, the output image Im (image displayed at the display device 10) in a case where the vehicle 1 is parked by travelling rearward to a target parking position P while turning to the left side (so-called a garage parking). In FIG. 21, the vehicle 1 is in a state of traveling in a straight line. In this state, in the output image Im, the display range Ad is narrow and facing substantially straight rearward and the transmission rate α is 0 (zero). The ratio change portion 122 and the display range decision portion 123 acquire the detection results, signals and data obtained by each portion at the time of parking operation of the vehicle 1 so as to change the transmission rate α and the display range Ad in a case where the aforementioned detection results, signals and data satisfy predetermined conditions. In FIG. 22, for example, in a case where a signal from the shift sensor 21 indicating that a reverse (backward) mode is selected (signal obtained in association with the driving operation of the driver) or a value (for example, the steering angle of each of the wheels 2, the position of the vehicle 1, the speed of the vehicle 1 and the like) of each portion (for example, the steering angle sensors 14, 15a, the wheel speed sensor 17, the torque sensor 20a and the like) related to the reverse traveling of the vehicle 1 at or below a predetermined speed while the vehicle 1 is turning is obtained, the display range decision portion 123 expands the display range Ad of the output image Im laterally (left-right direction) and slides (moves) the display range Ad in the turning direction (left side). Thus, in the present embodiment, as an example, the driver may easily grasp the surroundings of the vehicle 1 and the state outside the vehicle in the travelling direction. Further, in FIG. 22, the ratio change portion 122 increases the transmission rate α at the second region A2 to the extent of 0.6, for example. Thus, according to the present embodiment, as an example, the driver may further easily grasp the surroundings of the vehicle 1 and the state of the outside of the vehicle in the travelling direction because structures such as a pillar, a roof, a seat and a trim, for example, of the vehicle 1 are transparent. In FIG. 22, as an example, the additional image generation portion 124 adds the highlight display Imf1 in a frame shape surrounding the image Imb of the detected object B to the image Imb thereof, adds the highlight display Imf2 in a band shape overlapping the image Iml of a frame line L of the road surface to the image Iml, adds an image Imf3 indicating the target parking position P, and further adds an image Imf4 in a line shape indicating a moving path which is expected from the target parking position P or the steering angle, for example. Thus, according to the present embodiment, as an example, the driver may easily grasp the surroundings of the vehicle 1, the state of the outside of the vehicle in the travelling direction, the target parking position P, the future moving path and the like. Further, in FIG. 23, the vehicle 1 is in a state approaching the target parking position P. In this state, the ratio change portion 122 further increases the transmission rate α at the second region A2 to 1, for example. Thus, in the present embodiment, as an example, the driver may further easily visually recognize the image Imb of the surrounding object B (obstacle, vehicle, human being and the like) because structures such as a pillar, a roof, a seat and a trim, for example, of the vehicle 1 are completely transparent and may easily grasp the distance and relative position between the vehicle 1 and the obstacle (object B) in the surroundings of the vehicle 1 or the target parking position P. In addition, as an example, because the imaging is conducted so that a portion of the vehicle body of the vehicle 1 (bumper in the example of FIG. 23) is included in the vehicle outside image Imo, the driver may further easily grasp the distance and relative positional relationship between the vehicle 1 and the obstacle (object B) in the surroundings of the vehicle 1 or the target parking position P. The aforementioned control may be performed in the same manner in a case where the vehicle is parked while turning in an opposite direction (right direction).

In the present embodiment, as an example, in a case where the object position determination portion 121 determines that the object B different from the structures of the vehicle 1 (vehicle body) (human being, luggage, goods and the like) is included in the vehicle inside image Imi, the image generation portion 125 may delete the image Imb of the aforementioned object B from the output image Im. In this case, whether or not the image Imb of the object B is deleted and which image Imb of the object B among the plural objects B is deleted, for example, may be arbitrary specified. In addition, the image generation portion 125 may fill a region where the image Imb of the object B is deleted in the vehicle inside image Imi with the vehicle inside image Imb (initial image) which is obtained in a state where the object B is not present at the vehicle interior. The vehicle inside image Imb in a state where the object B is not present at the vehicle interior is stored beforehand at the memory portion such as the SSD 11d, for example. Accordingly, in a case where the image Imb of the object B at the vehicle interior is deleted, as an example, the region within the window frame 1a, i.e., the region where the vehicle outside image Imo is displayed is expanded as compared to the output image Im including the image Imb of the object B at the vehicle interior, which may increase visibility. The object position determination portion 121 utilizes a detection result of a sensor (as an example, infrared sensor or the like, not illustrated) detecting the object B itself provided at the vehicle interior to thereby enhance accuracy of determination of the object B.

In the present embodiment, as an example, the ECU 11 adjusts the luminance (brightness) of the output image Im of the display screen 10a of the display device 10 depending on the brightness at the vehicle interior. The image display system 100 according to the present embodiment may perform a processing by procedures illustrated in FIG. 24, as an example. First, the ECU 11 functions as the brightness acquisition portion 115 when a predetermined timing has come (Yes in step S11) and acquires the brightness at the vehicle interior based on the detection result of the brightness sensor 26 (step S12). Next, the ECU 11 acquires the transmission rate α at this time because the transmission rate α changes depending on the state of the vehicle 1 or a driver's choice (setting), for example (step S13). Next, the ECU 11 functions as the luminance change portion 118 and acquires a function, a coefficient, a constant, data and the like depending on the acquired transmission rate α and the brightness at the vehicle interior. The luminance change portion 118 calculates the luminance of the display device 10 or the luminance value of the output image Im in response to the brightness at the vehicle interior and the transmission rate α using the aforementioned function, coefficient, constant, data and the like to change the luminance or the luminance value to the aforementioned calculated values (step S14).

Figure 24:
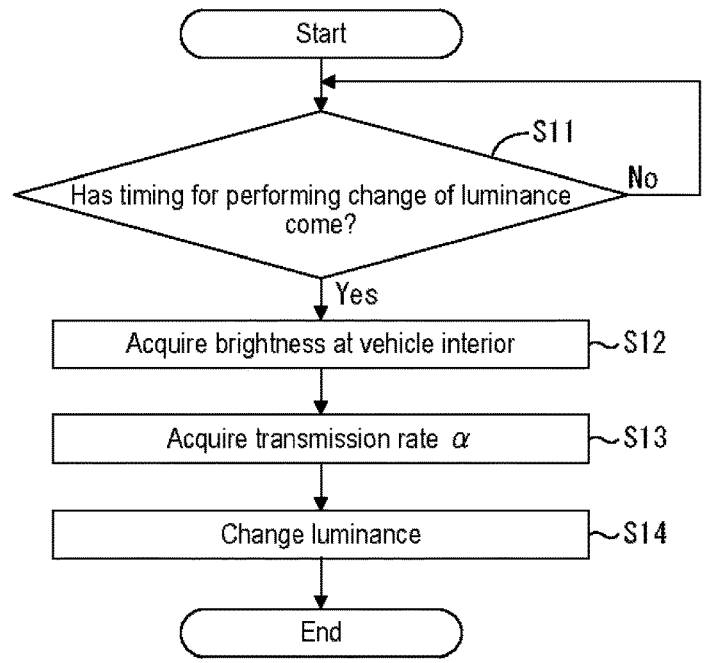
FIG. 24 is a flowchart showing an example of an operating procedure related to a luminance change of the image display system according to the embodiment.

With reference to the procedures in FIG. 24, the luminance (brightness) of the output image Im displayed at the display device 10 differs depending on the display mode (fully transmissive mode, half transmissive mode, locally heighted mode, and light transmissive state at the half mirror 31). First, in a case where the display unit 30 is used in the fully transmissive mode (in a state where the map of the half mirror 31 is not utilized), the luminance (brightness) of the output image Im displayed at the display device 10 is specified to be relatively large (high). Nevertheless, if the image is displayed at the same luminance (brightness) at nighttime or in a case where the vehicle interior is dark because the vehicle 1 is positioned in the shaded area or within a tunnel and at daytime or in a case where the vehicle interior is bright because the vehicle 1 is positioned in the sunshine, the image is difficult to be viewed and further a load on the driver's eyes may be large. Thus, according to the present embodiment, as an example, the ECU 11 functioning as the luminance change portion 118 changes the luminance of the display device 10 or the luminance of the output image Im depending on the detection result of the brightness sensor 26 within a range where the fully transmissive state is obtained at all over the half mirror 31. That is, the brighter the vehicle interior is, the larger (higher) the luminance of the display device 10 or the luminance of the output image Im is, and the darker the vehicle interior is, the smaller (lower) the luminance of the display device 10 or the luminance of the output image Im is.

The transmission state of the half mirror 31 changes by the brightness at front and rear of the half mirror 31. Thus, in a state where the display unit 30 is used in the half transmissive mode or the locally highlighted mode, the transmission state of the half mirror 31 may change if the brightness at the vehicle interior changes in a case where the luminance of the display screen 10a is constant. In this case, how the image or the map looks from the driver may change. Thus, according to the present embodiment, as an example, the luminance of the display device 10 is adjusted also in the half transmissive mode or the locally highlighted mode in the same manner as the procedures shown in FIG. 24. Nevertheless, a function, a coefficient, a constant, data and the like acquired at this time differ from the function, the coefficient, the constant, the data and the like in the aforementioned fully transmissive mode.

Then, the same view (how to look) as in FIGS. 18 to 23 is also obtainable in the half transmissive mode or the locally highlighted mode. That is, in the second region A2 outside of the window frame 1a, the display device 10 is inhibited from displaying the vehicle inside image Imi corresponding to the configurations of the vehicle interior. Thus, the driver visually recognizes the configurations of the vehicle interior by the map of the half mirror 31. In this case, the ECU 11 functioning as the luminance change portion 118 adjusts the luminance (brightness) with which the display device 10 displays the vehicle outside image Imo at the second region A2 depending on the transmission rate α. Specifically, in a case where the transmission rate α is 0 (α=0) as illustrated in FIGS. 18 and 21, the display device 10 does not display the vehicle outside image Imo at the second region A2 and displays the vehicle outside image Imo only at the first region A1. In this case, the ECU 11 functioning as the luminance change portion 118 changes the luminance of the display device 10 or the luminance of the output image Im depending on the detection result of the brightness sensor 26 to thereby adjust the luminance (brightness) of the vehicle outside image Imo displayed at the first region A1. That is, the luminance change portion 118 increases the luminance (brightness) of the vehicle outside image Imo at the first region A1 within a range where the half mirror 31 is locally brought to the fully transmissive state at the first region A1 so that the local luminance (brightness) of the vehicle outside image Imo at the first region A1 increases in association with the increase of brightness at the vehicle interior. Thus, the map of the half mirror 31 and the image (vehicle outside image Imo) of the display device 10 overlap each other at the first region A1 to restrain an inconvenience where the object is multiply-viewed in a slightly displacement manner, for example, and a clear view may be obtained.

In each case of FIGS. 19, 20 and 22 (0<α<1), the ECU 11 functioning as the luminance change portion 118 adjusts the luminance (brightness) of the vehicle outside image Imo displayed at the second region A2 depending on the detection result of the brightness sensor 26. That is, the luminance change portion 118 increases the local luminance (brightness) of the vehicle outside image Imo at the second region A2 in association with the increase of brightness at the vehicle interior within a range where the half mirror 31 is locally brought to the half transmissive state at a portion where the half mirror 31 overlaps the second region A2 (so that the locally half transmissive state of the half mirror 31 is maintained substantially constant). In each case of FIGS. 19, 20 and 22 (0<α<1), the ECU 11 functioning as the luminance change portion 118 adjusts the luminance (brightness) of the vehicle outside image Imo displayed at the first region A1 depending on the detection result of the brightness sensor 26. That is, the luminance change portion 118 increases the local luminance (brightness) of the vehicle outside image Imo at the first region A1 in association with the increase of brightness at the vehicle interior within a range where the half mirror 31 is locally brought to the fully transmissive state at a portion where the half mirror 31 overlaps the first region A1. That is, in each case of FIGS. 19, 20 and 22 (0<α<1), the ECU 11 controls the display device 10 so that the continuous vehicle outside image Imo is displayed over the first region A1 and the second region A2 in a state where the luminance of the first region A1 is higher (greater) than the luminance of the second region A2. Accordingly, the map of the half mirror 31 and the image (vehicle outside image Imo) of the display device 10 overlap each other at the first region A1 to restrain an inconvenience where the object is multiply-viewed in a slightly displacement manner, for example, and a clear view may be obtained. In a case where the transmission rate α is 1 (α=1) as illustrated in FIG. 23, the ECU 11 performs the processing (control) in the aforementioned fully transmissive mode.

In a case where the half mirror 31 is utilized, the change of the transmission rate α (at the second region A2) (step S2) depending on the various states shown by the procedures in FIG. 17 may be realized by the luminance change portion 118 or the image generation portion 125 changing the luminance of the display device 10 or the luminance value of the output image Im depending on the aforementioned states. Accordingly, each of the luminance change portion 118 and the image generation portion 125 is an example of a ratio change portion. In addition, each of the luminance change portion 118 and the image generation portion 125 serves as an example of a display mode switching portion switching the display mode (fully transmissive mode (fully transmissive state), half transmissive mode (half transmissive state), locally highlighted mode, and light transmissive state at the half mirror 31) in a case where the half mirror 31 is utilized.

The Function, the coefficient, the constant, the data and the like indicating the luminance (so as to obtain the luminance) corresponding to the brightness at the vehicle interior related to the aforementioned procedures in FIG. 24 are stored at the nonvolatile memory portion such as the ROM 11b, the SSD 11d and the like. According to the aforementioned explanation, it may be understood that the function, the coefficient, the constant, the data and the like indicating the luminance (so as to obtain the luminance) corresponding to the brightness at the vehicle interior may be stored per transmission rate α. Alternatively, the luminance change portion 118 may control the display device 10 so that the luminance (brightness) of the vehicle outside image Imo at the second region A2 becomes larger (higher) in association with the increase of the transmission rate α by multiplying the image data (luminance value of each pixel) by a coefficient which becomes greater in association with the increase of the transmission rate α.

As explained above, in the present embodiment, as an example, the ECU 11 (image display control apparatus) includes, as an example, the image generation portion 125 generating the output image Im which resembles a map of a room mirror using at least the vehicle outside image Imo based on at least one of the detection result of the eye point position acquisition portion 113 detecting the position of the eye point Pi of the driver D and the detection result of the angle acquisition portion 114 detecting the angle of the display device 10, and the display control portion 11e controlling the display device 10 so that the display device 10 displays the output image Im generated by the image generation portion 125. Accordingly, in the present embodiment, as an example, the output image Im similar to the map of the room mirror may be displayed at the display device 10. In addition, because the change of the output image Im conforming to the change of the position of the eye point Pi or the change of the angle of the display device 10 is similar to the room mirror, the driver may use the display device 10 as the room mirror.

In addition, in the present embodiment, as an example, the image generation portion 125 specifies a portion of the vehicle outside image Im that is generated to be the output image Im. Thus, according to the present embodiment, as an example, the display range of the display device 10 may be relatively easily changed.

Further, in the present embodiment, as an example, the image generation portion 125 changes the size of the image Imb of the object B included in the output image Im depending on the position of the object B detected by the object detection portion 119 detecting the object B at the vehicle exterior. Thus, according to the present embodiment, as an example, the size of the image Imb of the object B at the vehicle exterior may be accurately displayed at the display device 10.

Further, in the present embodiment, as an example, the display screen 10a of the display device 10 is covered by the half mirror 31, and the display control portion 11e controls the display device 10 so that the display device 10 displays the output image Im with the luminance with which the half mirror 31 is in the fully transmissive state. Thus, in the present embodiment, as an example, the display device 10 may be used in a state where the map of the half mirror 31 is not used. Thus, as an example, an occurrence of an event where the image or the map is less visible because of a difference between the output image Im of the display device 10 and the map of the half mirror 31 may be restrained.

Further, in the present embodiment, as an example, the display screen 10a of the display device 10 is covered by the half mirror 31, the image generation portion 125 generates the output image Im (vehicle outside image Imo) indicating the scene at the vehicle exterior, and the display control portion 11e controls the display device 10 so that the display device 10 displays the output image Im with the luminance with which the half mirror 31 is in the half transmissive state. Thus, according to the present embodiment, as an example, it is capable of overlapping the vehicle inside image Imi by the map of the half mirror 31 with the vehicle outside image Imo output from the display device 10.

Further, in the present embodiment, as an example, the display screen 10a of the display device 10 is covered by the half mirror 31, and the luminance change portion 118 is provided to increase the luminance of the display device 10 or the luminance value of the output image Im in association with the increase of the brightness at the vehicle interior detected by the brightness sensor 26 (brightness detection portion) detecting the brightness at the vehicle interior within a range where the transmission state at the half mirror 31 is maintained in at least one of the fully transmissive state and the half transmissive state. Accordingly, in the present embodiment, as an example, the image or the map may be restrained from being less visible because of the change of the transmission state of the half mirror 31 depending on the change of the brightness at the vehicle interior.

Further, in the present embodiment, as an example, the display screen 10a of the display device 10 is covered by the half mirror 31, and the image generation portion 125 generates the output image Im (vehicle outside image Imo) corresponding to the region of the window 1c of the vehicle 1 within the map of the half mirror 31. Thus, in the present embodiment, as an example, the vehicle outside image Im viewed from the window 1c may be clearly visually recognized.

Further, in the present embodiment, as an example, the display screen 10a of the display device 10 is covered by the half mirror 31, and the display control portion 11e is configured to control the display device 10 so that at least the fully transmissive state of the half mirror 31 and the half transmissive state of the half mirror 31 are switchable. Accordingly, in the present embodiment, as an example, the output image Im conforming to a driving condition or a preference of the driver, for example, may be likely to be displayed at the display device 10.

First Alternative Example

Figure 25:
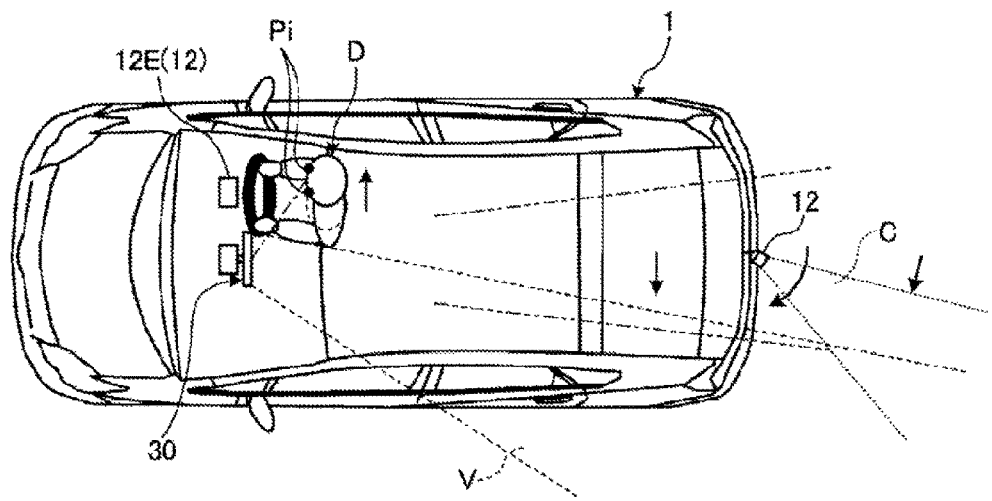
FIG. 25 is a schematic view of changes of a range viewed as a map of a half mirror (room mirror) corresponding to a change of a position of a driver's eye point and of an imaging range by an imaging portion in an example of an image display system according to a first alternative example.

An alternative example illustrated in FIG. 25 includes the same construction as the aforementioned embodiment. Thus, in the present alternative embodiment, the same result (effect) based on the same construction is obtainable. In the present alternative example, however, as illustrated in FIG. 25, the imaging portion 12 at the vehicle exterior is movably (rotatably) configured by an actuator (for example, a motor and the like). In association with the movement (rotation) of the imaging portion 12, an imaging range C is changed. The ECU 11 functioning as the imaging range control portion 117 controls (the actuator of) the imaging portion 12 so that the imaging range C is changed. Then, in the present alternative example, the imaging range control portion 117 controls (changes) the imaging range C depending on the change of the position of the eye point Pi of the driver D or the change (not illustrated) of the angle of the display device 10. Accordingly, the imaging portion 12 may obtain the vehicle outside image Imo including a less torsion. In the present alternative example, as an example, the output image Im with less inconvenience (as an example, less torsion) may be obtainable from the vehicle outside image Imo capturing the range (imaging range) conforming to the position of the eye point Pi of the driver D detected by the eye point position acquisition portion 113 or the angle of the display device 10 detected by the angle acquisition portion 114. Procedures using the output image Im that is obtained are the same as the aforementioned embodiment.

Second Alternative Example

Figure 26:
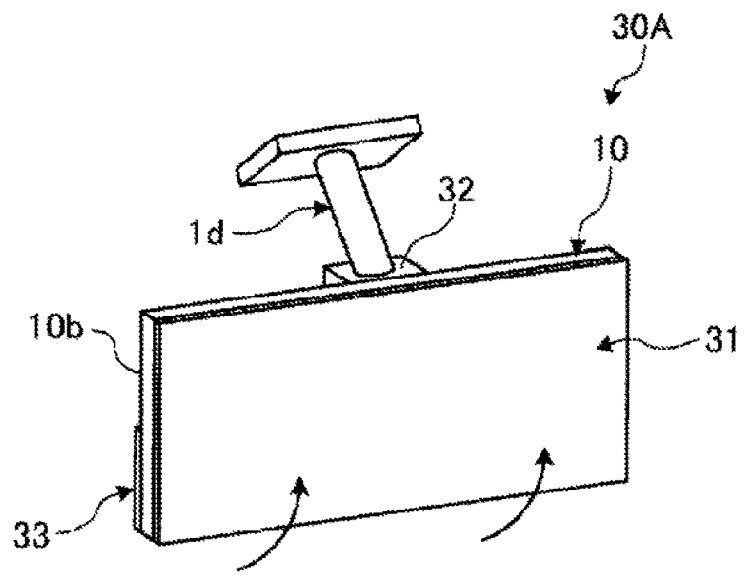
FIG. 26 is a perspective view of an example of a display unit included in an image display system according to a second alternative example and is a diagram illustrating a deployed state.
Figure 27:
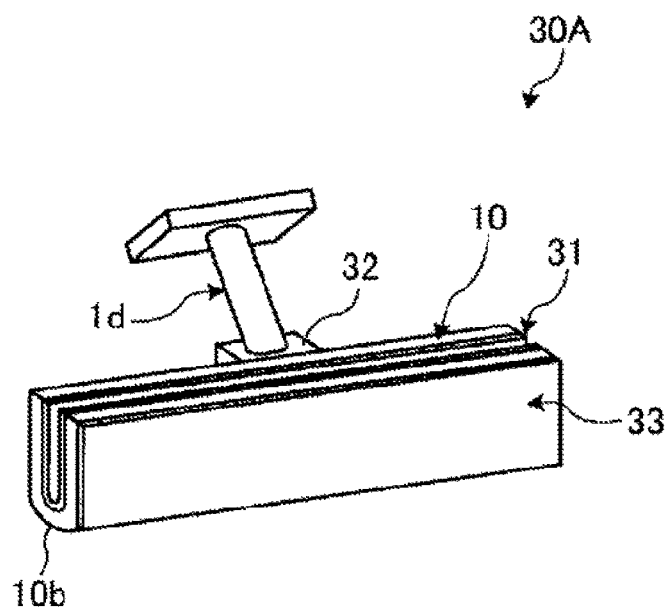
FIG. 27 is a perspective view of the example of the display unit included in the image display system according to the second alternative example and is a diagram illustrating a folded state.

FIGS. 26 and 27 each include the same construction as the aforementioned embodiment. Thus, in the present alternative example, the same result (effect) based on the same construction is obtainable. However, in a display unit 30A according to the present alternative example, the display device 10 and the half mirror 31 are foldable (bendable) between a deployed state illustrated in FIG. 26 and a folded state illustrated in FIG. 27. That is, in the present alternative example, the display device 10 is configured as a flexible display. In the deployed state illustrated in FIG. 26, the calculation processing and the like are performed in the same way as the aforementioned embodiment. In the folded state illustrated in FIG. 27, however, a mirror 33 is attached to a surface 10b (rear surface) of the display device 10 that exposes to the driver (vehicle rearward side) by folding-up of a lower portion to flip up to an upper side. Thus, as illustrated in FIG. 27, the mirror 33 (room mirror) is usable in the folded state.

The examples of the embodiment of the present invention have been explained in the above, however, the aforementioned embodiment and alternative examples are proposed as examples and not intended to limit the scope of the invention. The above embodiment and alternative examples may be performed in other various modes. Without departing from the spirit of the invention, various omissions, replacements, combinations and changes may be made. The constructions or shapes of each embodiment are partially switchable to be performed. Specifications (configuration, type, direction, shape, size, length, width, thickness, height, quantity, layout, position, material and the like) of each construction and shape, for example, may be appropriately changed to be performed.

EXPLANATION OF REFERENCE NUMERALS

1: vehicle, 1c: window, 10: display device, 10a: display screen, 11: ECU (image display control apparatus), 11e: display control portion, 12: imaging portion, 26: brightness sensor (brightness detection portion), 30: display unit, 31: half mirror, 117: imaging range control portion, 118: luminance change portion, 119: object detection portion, 125: image generation portion, B: object, C: imaging range, D: driver, Pi: eye point, Im: output image, Imo: vehicle outside image, Imb: image of object

The invention claimed is:
1. An image display control apparatus comprising:
an image generation portion that generates an output image including a first region and a second region, based on at least one of a detection result of an eye point position acquisition portion detecting a position of an eye point of a driver and a detection result of an angle acquisition portion detecting an angle of a display device, the first region including only a vehicle outside image showing a scene outside a vehicle, the second region including a vehicle inside image and the vehicle outside image aligned in position and superimposed with a preset transparency, the vehicle inside image showing a scene inside the vehicle;
a display control portion that controls the display device to display the output image generated by the image generation portion, the display device having a display screen covered by a half mirror; and
a luminance change portion that locally increases a luminance of the first region on the display device or a luminance value of the first region of the output image in a range such that the first region on the half mirror is locally placed in a fully transmissive state, in accordance with an increase in a brightness of a vehicle interior detected by a brightness detection portion, such that the first region locally maintains the fully transmissive state, wherein the first region corresponds to a region inside a window frame in the vehicle inside image and the second region corresponds to a region other than the first region outside the window frame, and wherein the second region is placed in a half-transmissive state or a total reflection state.

2. The image display control apparatus according to claim 1, comprising an imaging range control portion that controls an imaging portion to change an imaging range on a basis of at least one of the detection result of the eye point position acquisition portion, the imaging portion that captures the vehicle outside image.

3. The image display control apparatus according to claim 1, wherein the image generation portion changes a size of an image of an object included in the output image depending on a position of the object detected by an object detection portion detecting the object at a vehicle exterior.

4. The image display control apparatus according to claim 1, wherein
the display control portion controls the display device to display the output image with a luminance with which the half mirror is in a fully transmissive state.

5. The image display control apparatus according to claim 1, wherein
the image generation portion generates the output image showing a scene of a vehicle exterior,
the display control portion controls the display device to display the output image with a luminance with which the half mirror is in a half transmissive state.

6. The image display control apparatus according to claim 1, wherein
the luminance change portion increases a luminance of the display device or a luminance value of the output image in a range such that the half mirror is maintained in one of a fully transmissive state and a half transmissive state, in accordance with an increase in the brightness of the vehicle interior detected by the brightness detection portion.

7. The image display control apparatus according to claim 1, wherein
the image generation portion generates the output image corresponding to a region of a window of a vehicle within a map of the half mirror.

8. The image display control apparatus according to claim 1, wherein
the display control portion is configured to control the display device so that at least a fully transmissive state of the half mirror and a half transmissive state of the half mirror are switchable.

9. The image display control apparatus according to claim 1, wherein the first region is locally placed in a fully transmissive state, such that the half mirror is not placed in a half-transmissive state.

10. The image display control apparatus according to claim 1, wherein the luminance of the second region is increased from a half transmission state to a total reflection state as the brightness in the vehicle interior increases.

11. The image display control apparatus according to claim 1, wherein the luminance of the first region is greater than the luminance of the second region.

12. The image display control apparatus according to claim 1, wherein
when a passenger or an object overlaps with the window frame, the image generation portion sets the first region to a region of the output image excluding the passenger or the object.

13. An image display system comprising:
an image display control apparatus including:
an image generation portion that generates an output image including a first region and a second region, based on at least one of a detection result of an eye point position acquisition portion detecting a position of an eye point of a driver and a detection result of an angle acquisition portion detecting an angle of a display device, the first region including only a vehicle outside image showing a scene outside a vehicle, the second region including a vehicle inside image and the vehicle outside image aligned in position and superimposed with a preset transparency, the vehicle inside image showing a scene inside the vehicle;
a display control portion the controls the display device to display the output image generated by the image generation portion, the display device having a display screen covered by a half mirror; and
a luminance change portion that locally increases a luminance of the first region on the display device or a luminance value of the first region of the output image in a range such that the first region on the half mirror is locally placed in a fully transmissive state, in accordance with an increase in a brightness of a vehicle interior detected by a brightness detection portion, such that the first region locally maintains the fully transmissive state, and
an imaging portion that captures a scene inside or outside a vehicle,
wherein the first region corresponds to a region inside a window frame in the vehicle inside image and the second region corresponds to a region other than the first region outside the window frame, and
wherein the second region is placed in a half-transmissive state or a total reflection state.

14. A display unit comprising:
a display device including:
an image generation portion that generates an output image including a first region and a second region, based on at least one of a detection result of an eye point position acquisition portion detecting a position of an eye point of a driver and a detection result of an angle acquisition portion detecting an angle of a display device, the first region including only a vehicle outside image showing a scene outside a vehicle, the second region including a vehicle inside image and the vehicle outside image aligned in position and superimposed with a preset transparency, the vehicle inside image showing a scene inside the vehicle;
a display control portion the controls the display device to display the output image generated by the image generation portion, the display device having a display screen covered by a half mirror; and
a luminance change portion that locally increases a luminance of the first region on the display device or a luminance value of the first region of the output image in a range such that the first region on the half mirror is locally placed in a fully transmissive state, in accordance with an increase in a brightness of a vehicle interior detected by a brightness detection portion, such that the first region locally maintains the fully transmissive state, and a half mirror that covers a display screen of the display device,
wherein the first region corresponds to a region inside a window frame in the vehicle inside image and the second region corresponds to a region other than the first region outside the window frame, and
wherein the second region is placed in a half-transmissive state or a total reflection state.

\* \* \* \* \*